(12) United States Patent
Goodrum

(10) Patent No.: US 6,260,095 B1
(45) Date of Patent: *Jul. 10, 2001

(54) BUFFER RESERVATION METHOD FOR A BUS BRIDGE SYSTEM

(75) Inventor: Alan L. Goodrum, Tomball, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/162,924

(22) Filed: Sep. 29, 1998

Related U.S. Application Data

(63) Continuation of application No. 08/774,746, filed on Dec. 31, 1996, now Pat. No. 5,815,677.

(51) Int. Cl.[7] .............................. G06F 13/00; G06F 13/38
(52) U.S. Cl. ..................... 710/129; 710/126; 710/128; 710/22
(58) Field of Search .................................. 710/126, 129, 710/52–57, 110, 112

(56) References Cited

U.S. PATENT DOCUMENTS

| 4,860,193 | * | 8/1989 | Bentley et al. | 710/56 |
|---|---|---|---|---|
| 5,542,055 | | 7/1996 | Amini et al. | 710/101 |
| 5,586,294 | * | 12/1996 | Goodwin et al. | 711/64 |
| 5,732,285 | * | 3/1998 | Harrison et al. | 710/56 |
| 5,758,191 | * | 5/1998 | Kasebayashi et al. | 710/56 |
| 5,797,042 | * | 8/1998 | Gaylord | 710/56 |
| 5,815,677 | * | 9/1998 | Goodrum | 710/126 |
| 5,859,988 | * | 1/1999 | Ajanovic et al. | 710/129 |
| 5,893,926 | * | 4/1999 | Saxena et al. | 710/170 |
| 5,941,962 | * | 8/1999 | Hirano | 710/53 |
| 5,983,293 | * | 11/1999 | Murakami | 710/56 |

* cited by examiner

*Primary Examiner*—Robert Beausoleil
*Assistant Examiner*—Raymond N Phan
(74) *Attorney, Agent, or Firm*—Akin, Gump, Strauss, Hauer & Feld, LLP

(57) ABSTRACT

A method for transferring data through a bus bridge. The bus bridge includes a number of data buffers for storing data, prefetching data and write posting data. A device communicating with the bus bridge may reserve a buffer by one of two reservation mechanism. The reservation mechanism provides the bus bridge with the address and byte count. The reservation may also be forwarded to any upstream bus bridges. The reserved buffers are prefetched for efficient use of bus access. Data is prefetched and flushed according to alternative algorithms if a buffer is not reserved.

80 Claims, 16 Drawing Sheets

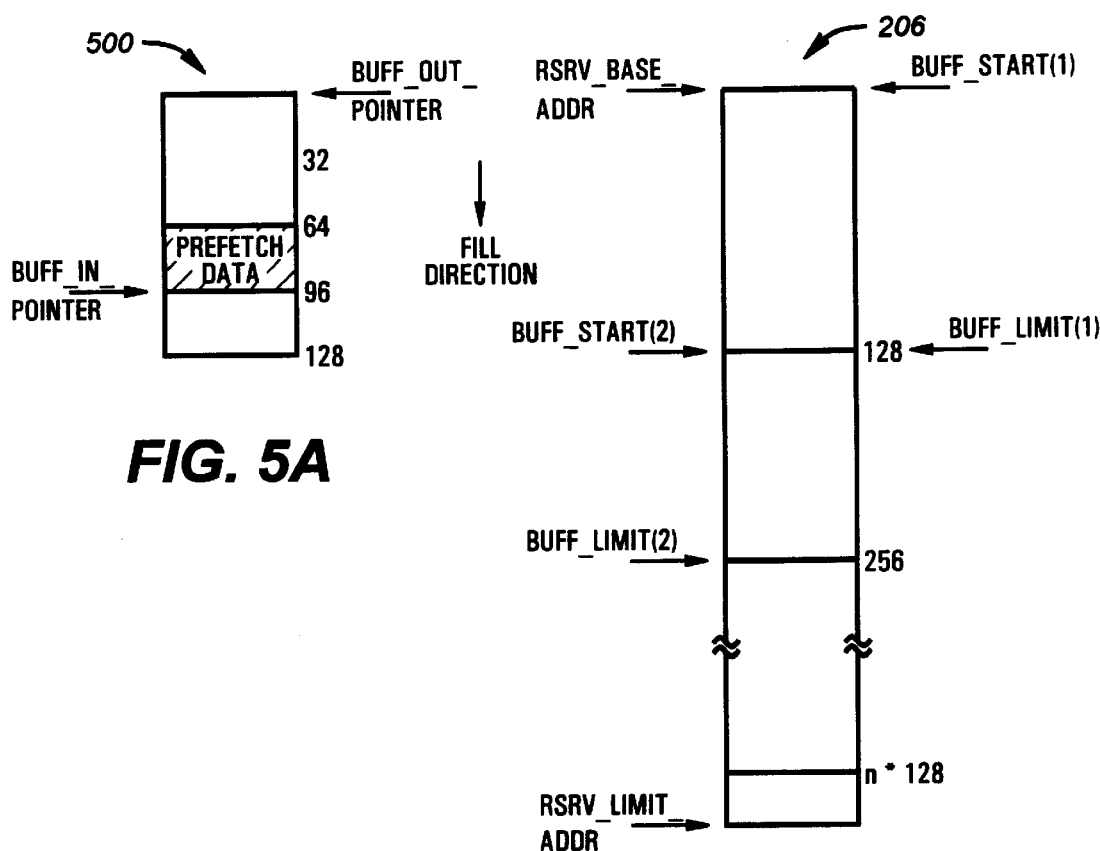
FIG. 5A
FIG. 5B
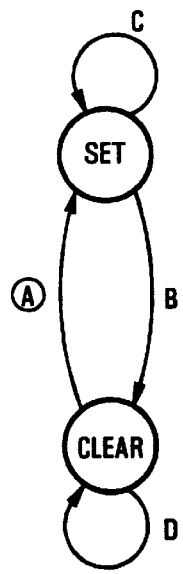
FIG. 6B

BUFFER RESERVATION METHOD FOR A BUS BRIDGE SYSTEM

SPECIFICATION

This application is a continuation of United States application Ser. No. 08/774,746 filed Dec. 31, 1996, now U.S. Pat. No. 5,815,677.

BACKGROUND OF THE INVENTION

1. Field of the Invention

The invention relates to a method for translating operations from one bus to another bus and more particularly to a buffer reservation mechanism for optimally transferring data between buses.

2. Description of the Related Art

Personal computers are constantly changing as new technologies evolve and are incorporated into the computer. Performance improvements in the microprocessor and memory have resulted in computers so powerful that they are now capable of performing tasks that before could only be performed by large mainframe computers. However, to fully replace a mainframe computer, the computer must have significant memory and storage capacity supported by a hearty I/O (input/output) subsystem.

Several standardized I/O buses are available to the system designer including: ISA (Industry Standard Architecture); EISA (Extended Industry Standard Architecture); and PCI (Peripheral Component Interface). Today's computers are typically designed with some combination of the three. For moving data between the buses, a bridge device is typically provided.

The bridge device connects to both buses for transferring data between the buses and translating the bus control signals. The buses can be different, or especially in the case of PCI, the bridge can simply provide an electrical extension to the same logical bus. This electrical separation makes it possible to meet the PCI bus requirement of limiting the number of physical devices on one bus segment, while at the same time not limiting the total number of PCI agents. In PCI bus vernacular, an agent is the term denoting the class of devices connecting to the bus, including master and slave devices.

These buses all support a scheme called bus mastering wherein a device or agent, usually other than the processor, may request an arbiter for control of the bus. If the arbiter grants the agent control, the agent becomes a bus master. The bus master directs its operations to another agent called a slave. The bus master may then perform operations without processor intervention much more efficiently than if the processor were involved. Many times a master on an origination bus will communicate with a slave on a destination bus. If the buses are coupled by a bridge, the performance of the bridge greatly effects the performance of the communication between the master and slave. Thus, it is desirable to optimize this pathway.

In the case of the PCI bus, one method of improving performance is to permit delayed transactions or read posting. More details on the PCI bus and on Delayed Transactions are found in the PCI Local Bus Specification version 2.1 which can be obtained from the PCI Special Interest Group, Hillsboro, Oreg. The PCI Local Bus Specification and its related documentation are hereby incorporated by reference. Delayed transactions permit the bus to be used while a slow device is preparing data in response to a request. Thus, instead of the slow device applying wait states to the bus, the bus may be used for other requests. For a bridge, the destination bus means the interface that was not acting as the target of the original request. A delayed transaction progresses to completion in three phases: the request by the master; completion of the request by the target; and the completion of the transaction by the master.

In the first phase, the master generates a transaction on the bus, the target decodes the access, latches the information required to complete the access and terminates the request with a retry-termination. Since the master cannot distinguish between a target which is completing the transaction using delayed transaction termination and a target which simply cannot complete the transaction at the current time, it must reissue the request. During the second phase, the target independently completes the request on the destination bus using the latched information from the delayed request. If the delayed request is a read, the target obtains the requested data and completion status. If the delayed request is a write, the target delivers the write data and obtains the completion status. During the third phase, the master successfully rearbitrates for the bus and reissues the original request. The target decodes the request and provides the master with the completion status (and data if a read request). All bus commands that must complete on the destination bus before completing on the originating bus may be completed as a delayed transaction. These include interrupt acknowledge, I/O read, I/O write, configuration read, configuration write, memory read, memory read line and memory read multiple commands. Memory write and memory write and invalidate commands can complete on the originating bus before completing on the destination bus. These commands are not completed using delayed transactions termination and are normally posted.

One such bridge device is the Intel PCI to EISA bridge chip set. The 82375EB/SB PCI-EISA Bridge and the 82374EB/SB EISA system component work in tandem to provide an EISA I/O interface for computers having a PCI bus. The chip set can be either a master or slave on both the PCI and EISA buses. For PCI to EISA data transfers, four 32-bit posted write buffers are provided to enhance single cycle PCI bus transactions. For EISA to PCI data transfers, four 16-byte line buffers are included to support EISA bursting.

In order to use both buses efficiently, most bridges implement some amount of data buffering within the bridge itself. This allows the bridge to de-couple the buses from each other and let each bus run at its maximum speed without being slowed down by the other. There are generally two types of buffers that may be implemented in a bridge: write posting buffers and read prefetch or read ahead buffers. Both types can be implemented on either bus.

Write posting buffers accept write data from one bus and acknowledge reception to that bus. This frees the bus to perform other transactions. The bridge temporarily stores, or posts, the write data until it can be written to the other bus. Read prefetch buffers take the address from a single read access and read additional data speculating that it will also be needed. The bridge then holds that data in a buffer until it is either unusable or it is used by a read access.

In the Intel chip set, the buffer permits the bridge to receive short bursts of data at peak data transfer rates. For example, if a EISA device requests data from memory on the PCI bus, the bridge can burst four 32-bit data words from the PCI memory into its buffer and then release the PCI bus to other PCI requesters while the EISA device reads the buffers. Therefore, the PCI bus is not held up by the EISA device. While the buffer is filled, the EISA device is notified to read the data from the buffer. The EISA device may then read the data from the buffer at its burst transfer speed. Thereafter, the bridge attempts to keep up with the EISA bus transfer rate by performing short burst of data across the PCI bus to keep the buffer filled. However, if another EISA device requests data from memory, the buffer must be flushed and filled again.

Buffers also introduce problems with data consistency. While data is buffered in the bridge, a bus agent and the processor may have different ideas about what is really in memory. When a bus master issues a read request through the bridge to a target memory range on the other side of the bridge, the bridge must balance between two conflicting goals: performance and data integrity. If the memory operation and transfer were optimized for performance, the bridge would preferably hold large blocks of prefetched data. However, if data is prefetched in large blocks but unused, the bridge must guard against providing stale data on a subsequent read request by a master. Additionally, prefetching large blocks of unused data hurts performance by wasting bus bandwidth. Thus, it is desirable to find a solution which both meets performance concerns and also guarantees data integrity.

Buses can also operate at different frequencies. The bridge must therefore synchronize the signals as they are translated from one bus at one frequency to another bus at another frequency. If a continuous flow of data is to be achieved, the synchronization must not be at the expense of performance.

SUMMARY OF THE PRESENT INVENTION

A bus bridge for connecting two buses includes a plurality of data buffers. The data buffers are used for storing read data, storing prefetched or read-ahead data or for storing write posted data. According to the invention, the use of these data buffers reduces the number of times a device will access the buses, thereby reducing bus latency.

The bridge further includes a mechanism for reserving a data buffer. Two alternative mechanisms are disclosed whereby a bus master or agent coupled to the bridge may request that the bridge reserve a buffer for the bus master's intended data read transfer. If a hierarchy of bridges is present, the reservation request is passed on to upstream bridges supporting the buffer reservation mechanism.

The reservation request received by the bridge includes the addressing information necessary for the bridge to read-ahead or prefetch data as the bus master removes data from the reserved data buffer. When a reservation is placed, three 128-byte data buffers are reserved for the bus master. Data is prefetched into these data buffers in order and on a rotating basis as read by the master. When a data buffer is first accessed by the master, a next data buffer is prefetched. When the complete address range has been read and the data has been removed by the bus master, the reservation is canceled. If the buffer has not been accessed by a bus master within a programmable period of time, the reservation is also canceled. A reservation algorithm is disclosed for managing the reserved buffers.

The bridge further includes two alternative algorithms for managing the buffers if the reservation mechanism is not available to an agent. With the default algorithm, when a new bus master attempts a read without first reserving a buffer, the bridge allocates a buffer, comprising three 128-byte data buffers, to this master if a buffer is available, otherwise the master is forced to retry the read operation. Once the buffer is allocated, the bridge reads the requested data into a first of the 128-byte data buffers and subsequently provides the data to the bus master. If the master burst reads past the end of the first data buffer and the next read operation from the master starts where the last read ended, then prefetching is enabled for this master. On the next sequential read the bridge will again read the requested data into a second data buffer and subsequently provide it to the master. At this point prefetching is already enabled. Whenever the master again burst reads past the end of one of the buffers, the bridge automatically prefetches data for the next 128-byte buffer. The three 128-byte data buffers are filled in order and on a rotating basis. If the bus master requests a non-sequential read or if the CPU performs a write transaction which might affect the master, the buffer is flushed.

A conservative algorithm is similar to the default algorithm, but the bridge does no prefetching. If the bus master does not read all of the data, the remaining data is flushed when the master disconnects from the bus.

BRIEF DESCRIPTION OF THE DRAWINGS

A better understanding of the present invention can be obtained when the following detailed description of the preferred embodiment is considered in conjunction with the following drawings, in which:

FIG. 5A is a block diagram of a single 128-byte data buffer according to the preferred embodiment;

FIG. 5B is a block diagram of a reservation buffer according to the preferred embodiment;

FIG. 6B is a state diagram illustrating buffer prefetch states according to the preferred embodiment.

DETAILED DESCRIPTION OF THE PREFERRED EMBODIMENT

Figure 1A:
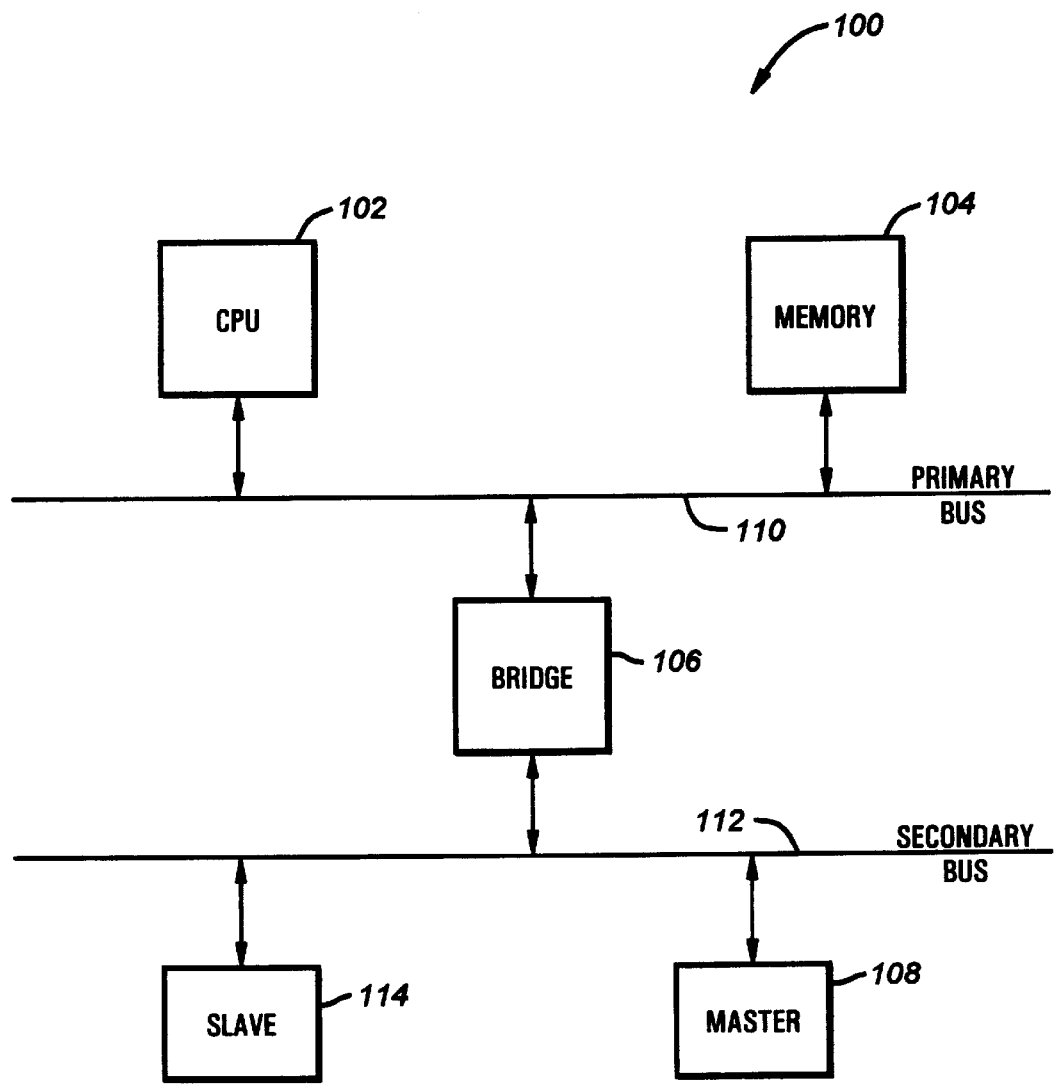
FIG. 1A is a block diagram of a computer system incorporating a bridge device according to the preferred embodiment.

Referring now to FIG. 1A, the bridge device 106 is illustrated according to the preferred embodiment. The bridge device 106 couples a primary bus 110 to a secondary bus 112 of a computer system 100. The computer system 100 further includes a CPU 102 and memory 104 coupled to the primary bus 110. In the preferred embodiment, the CPU 102 includes a processor (not shown) such as a 486, Pentium® or 586 class processor by Intel or their equivalents and standard computer peripherals and support logic (not shown) as is common in IBM compatible PCs. It is understood that other processors and peripherals could of course be utilized.

A bus master 108, such as a hard disk controller, video graphics controller or network interface controller, and bus slave 114, such as a serial port or parallel port are further connected to the secondary bus 112. For purposes of the principles disclosed in this invention, it is not necessary to identify the specific functionality of the bus master 108 and slave 114, therefore, they are simply referred to herein as generic bus masters and slaves.

The primary and secondary buses 110 and 112 are standard input/output buses such as the peripheral component interconnect (PCI) bus. It is understood that the principles herein disclosed may be applied to other buses as well, such as the industry standard architecture (ISA), extended industry standard architecture (EISA) and microchannel architecture (MCA) bus. Further, as can be appreciated, the same bridge design principles may also be applied to couple two dissimilar buses, such as a PCI bus and an EISA bus. In the preferred embodiment, the primary bus is a local PCI bus with limited electrical fanout and the bridge 106 is used to extend the functionality of the primary bus 110 by way of the secondary PCI bus 112.

Figure 1B:
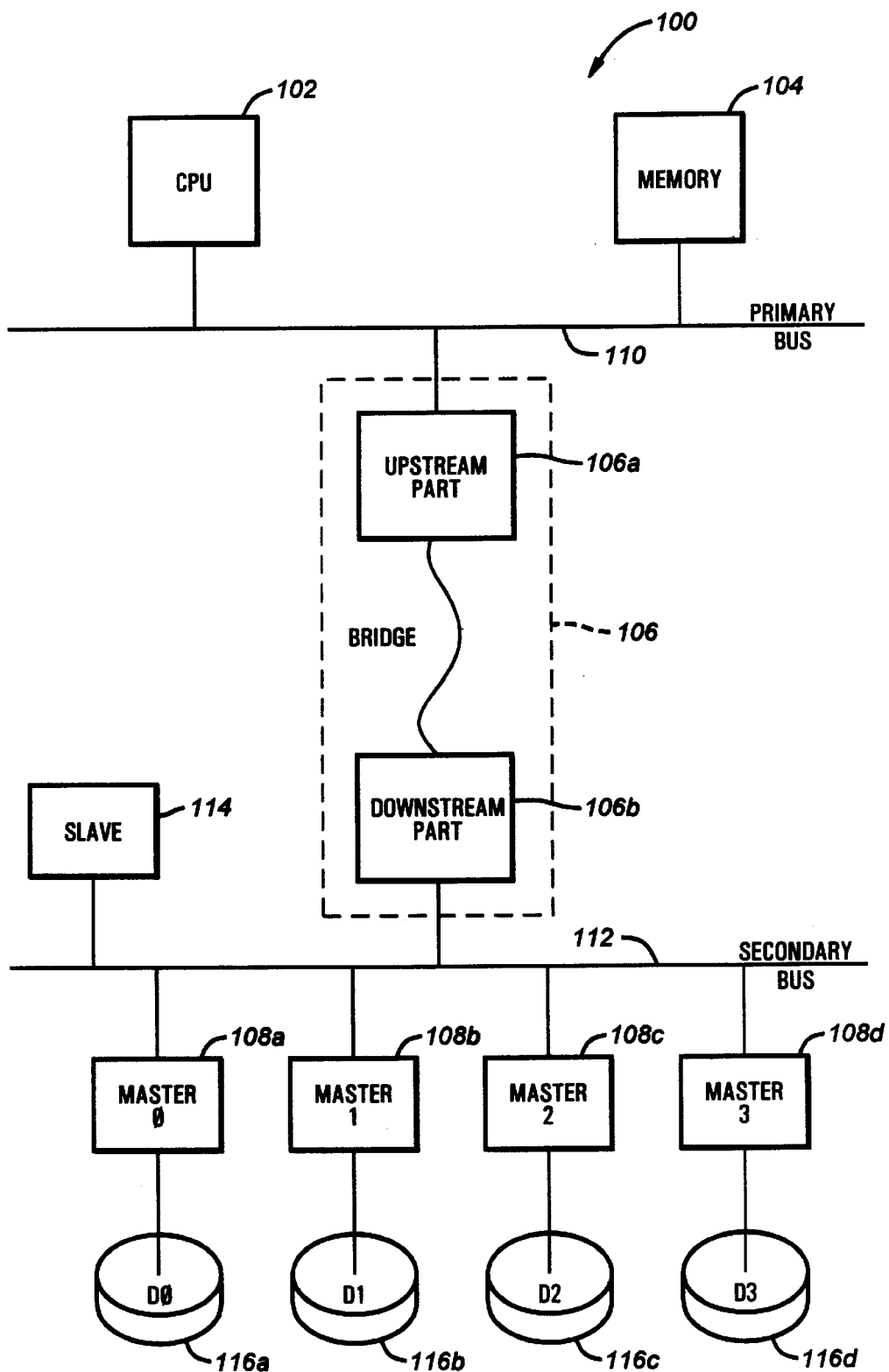
FIG. 1B is a more detailed block diagram of a computer system incorporating a bridge device according to the preferred embodiment.

In an alternative to FIG. 1A, shown in FIG. 1B, the secondary bus 112 is in a remote location from the computer system 100. The bridge 106 is further comprised of an upstream part 106a and a downstream part 106b. A cable 118 couples the upstream and downstream bridge instances together. The downstream part 106b is coupled to the secondary bus 112 for communicating with a plurality of bus masters 108a–d. Each bus master is further coupled to a plurality of hard disk drives 116a–d for providing mass storage to the computer system 100.

In both FIGS. 1A and 1B, the bridge 106 provides a common interface for devices on the secondary bus, such as the bus master 108, to communicate with devices on the primary bus, such as the memory 104. The bus master 108 may also communicate with other secondary bus devices, such as the bus slave 114, without requiring any bandwidth from the primary bus 110. Thus, in addition to being a translation unit and bus extender, the bridge 106 also functions as a isolation buffer.

When large blocks of data are transferred through the bridge, such as when the bus master 108 reads or writes to the memory 104, the bridge provides multiple buffers for read prefetching and write posting to enhance the overall system performance. This helps eliminate the typical requirement that both buses be communicating with the bridge 106 before a transfer can take place. The read prefetching is managed according to several alternative algorithms. One algorithm includes a mechanism in which a bus master can reserve a read prefetch buffer for very efficient bus transfers. Other adaptive algorithms handle those cases where the bus master does not request a buffer reservation. However, even for these cases, the algorithms attempt to reserve a buffer and prefetch data when certain conditions signify that a read prefetch will have a high probability of success.

Figure 2A:
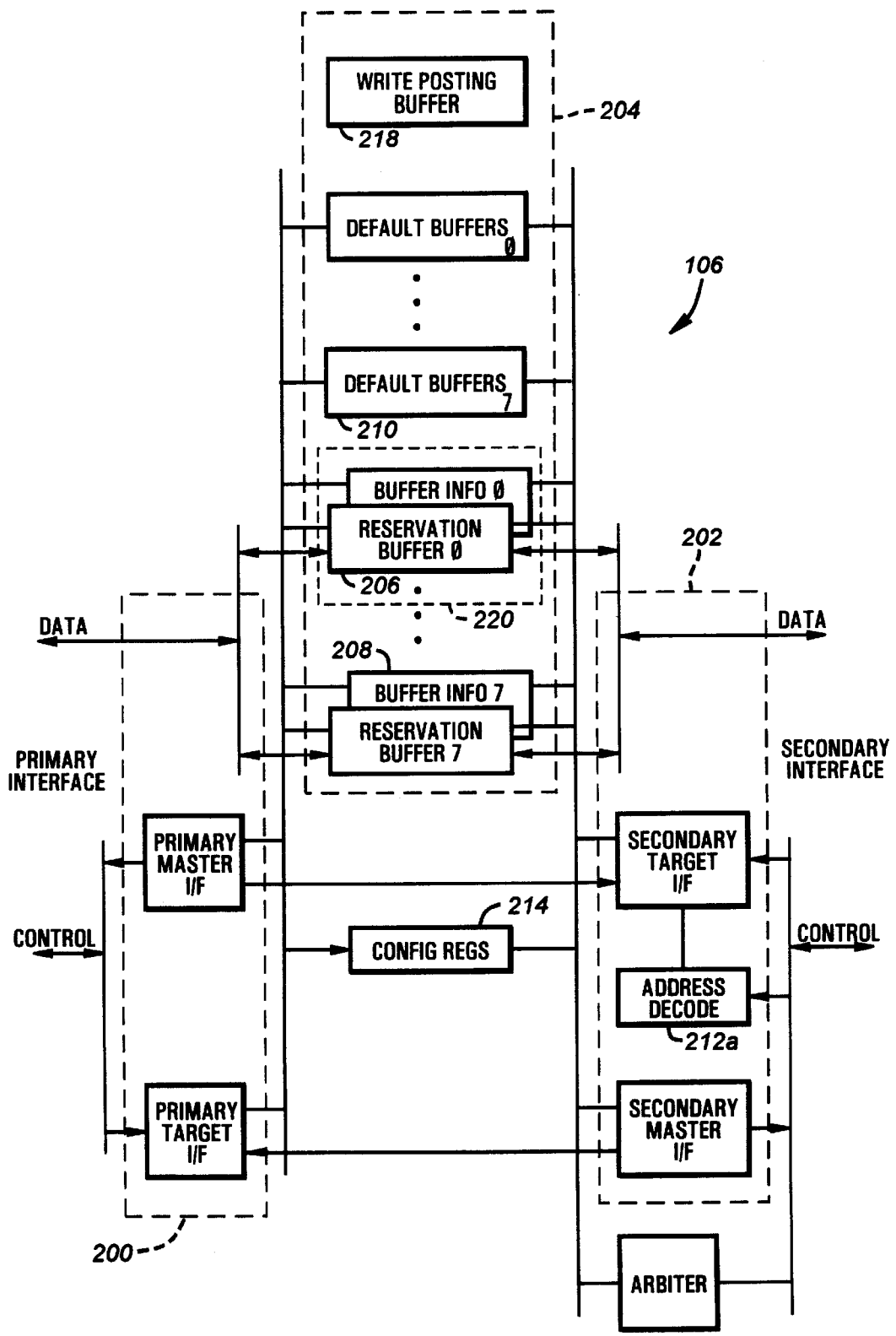
FIGS. 2A and 2B are block diagrams illustrating the functional blocks of the bridge device according to the preferred embodiment.
Figure 2B:
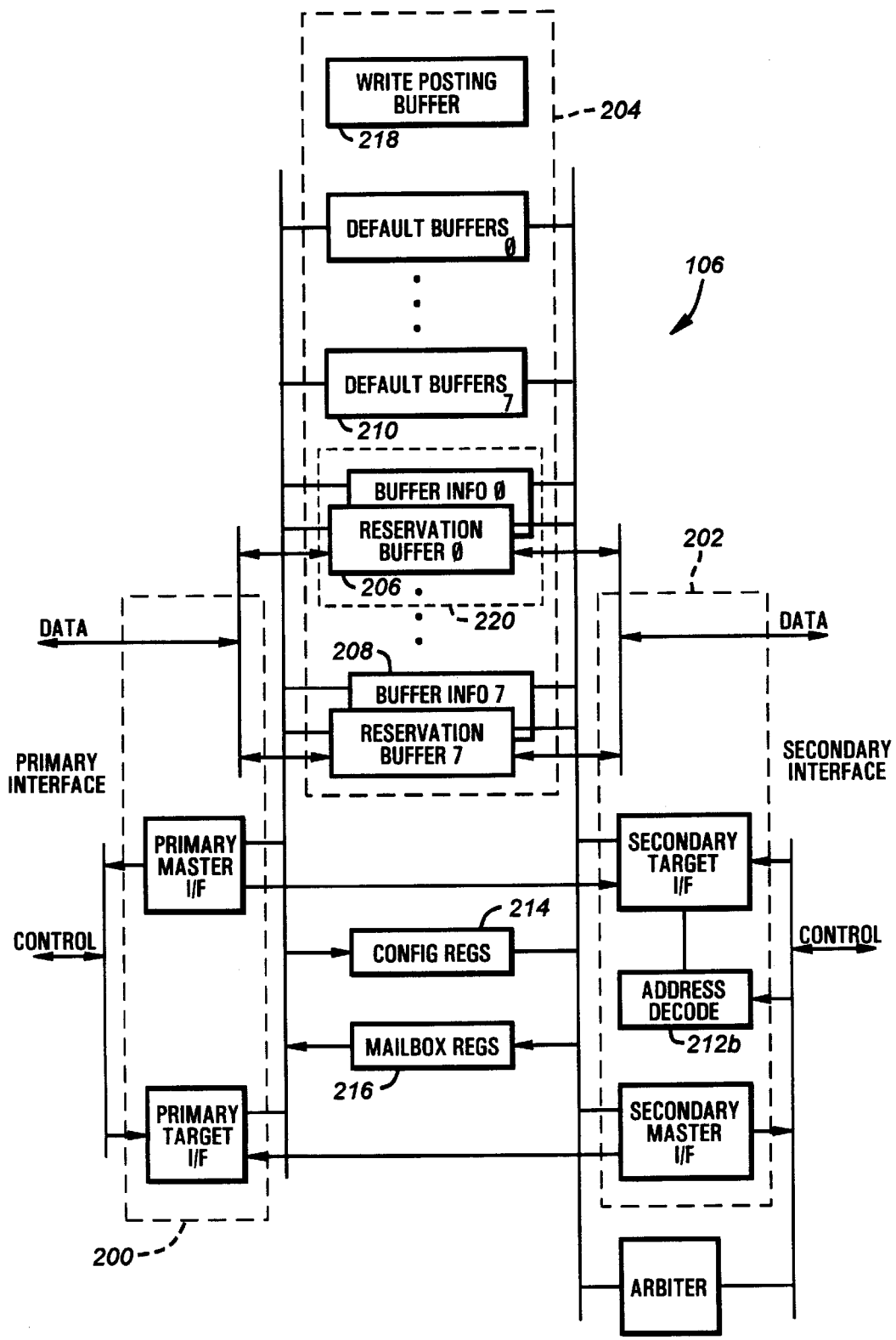

Now turning to FIGS. 2A and 2B, a block diagram of first and second embodiments of the bridge device 106 are illustrated. As can be seen, the primary bus couples to a primary bus interface 200 and the secondary bus couples to a secondary bus interface 202. The bridge 106 contains a buffer region 204 for receiving incoming data, read prefetching or read-ahead, or for write posting. The buffers are configured according to the type of operation, as described below.

Specifically, in the bridge 106, four 128-byte write posting buffers 218 are provided to enhance the performance of write operations. When the bus master 108 performs a write operation to main memory 104, the data is written or posted into the write buffers 218 and the bus master 108 receives a completion indication from the bridge 106 before the data is actually written to main memory 104. The bridge 106 then subsequently completes the write operation to main memory 104 without further delay. Thus, the time the bus master 108 controls the secondary bus 112 is greatly reduced since it does not wait for the actual completion indication.

The buffer region 204 also includes eight default buffers 210 for enhancing bus master read operations from main memory 104. A default buffer management algorithm manages the default buffers 210 for storing read data and prefetching read data under certain conditions. The default buffer management algorithm balances between holding the prefetch data as long as possible and yet avoids the possibility of retaining stale data. The buffers are filled and emptied using three 3-bit pointers to 32-bit double word chunks of data (hereinafter called DWORDS) in the buffers. A buffer input pointer (BUFF_IN_PNTR) points to where the next Dword will be stored; a buffer output pointer (BUFF_OUT_PNTR) points to where the next Dword will be read from; and a buffer valid pointer (BUFF_VALID_PNTR) indicates which addresses between BUFF_IN_PNTR and BUFF_OUT_PNTR are valid. Only certain addresses may be valid since to prevent bus locked situations a read completed after a posted memory write can be stored in the buffer, but cannot become valid until after the posted memory write completes.

As an alternative to the default buffer management algorithm, a conservative algorithm is provided to manage the default buffers 210. The conservative algorithm never prefetches and generally only reads data that has been requested by a bus master. Thus, stale data is avoided altogether.

The buffer region 204 also includes a pool of eight reservation resources 220 for enhancing bus master read operations from main memory 104. These resources 220 are managed by a reservation algorithm, discussed below. Each reservation resource 206 consists of three 128-byte data buffers and a corresponding reservation information block 208. Each information block 208 includes the registers necessary to control the reservation buffers, which include: a reservation base address register (RSRV_BASE_ADDR) containing a 64-bit starting address of the reservation; a reservation limit address register (RSRV_LIMIT_ADDR) containing a 64-bit address one larger than the last address of the reservation; a discard timer value programmed to one of four values (off, 25 ms 50 ms, or 100 ms) for automatically canceling inactive reservation resources; a last buffer indicator register (LAST_BUFF) containing a 5 bit pointer to the last line buffer data was read into; a buffer start pointer register (BUFF_START_PNTR) containing a 64-bit starting address of each line buffer; a buffer limit pointer register (BUFF_LIMIT_PNTR) containing a 64-bit address one larger than the last address of the line buffer; a buffer input pointer register (BUFF_IN_PNTR) for holding the address where the next Dword is stored; a buffer output pointer register (BUFF_OUT_PNTR) for holding the address where the next Dword will be read from; a buffer valid pointer register (BUFF_VALID_PNTR) for indicating which addresses between the BUFF_IN_PNTR and BUFF_OUT_PNTR are valid; a buffer state register; and a buffer prefetch flag register.

The default buffers 210 and reservation resources 220 may be allocated to each requesting master or to each process or thread, thereby allowing a single master to have multiple buffers. The buffer region 204 is organized as a FIFO, and of course, may be sized according to the requirements of the master for optimal bus utilization. Since the bridge 106 is preferably transparent to the requester and its target, it is desirable for the buffer region 204 to also be transparent to the transaction. However, to optimize the operation of the buffer region 204 it is desirable to control the buffers so that data will be prefetched efficiently and the prefetched data will be coherent with data in main memory. Therefore, to optimize the buffers for the pending transactions, it is desirable for the bridge to receive the range of addresses the master intends to read. Thus, once a bridge obtains the address information, the bridge may freely prefetch data up to the end of the address range. Two alternatives are provided for requesting a reservation resource.

In a first alternative reservation mechanism, illustrated in FIG. 2A, the secondary interface 202 contains a command decode block 212a. It is noted that while the command decode block 212a is located in the secondary interface 202 because memory read requests are from downstream bus masters, it is contemplated that a command decode block could also be effective in the primary interface 200 for read operations in the opposite direction. The reservation resource is most effective for read operations initiated by a bus master residing on the secondary bus 112 from main memory 104, thus, the following description is presented in that context.

Figure 4A:
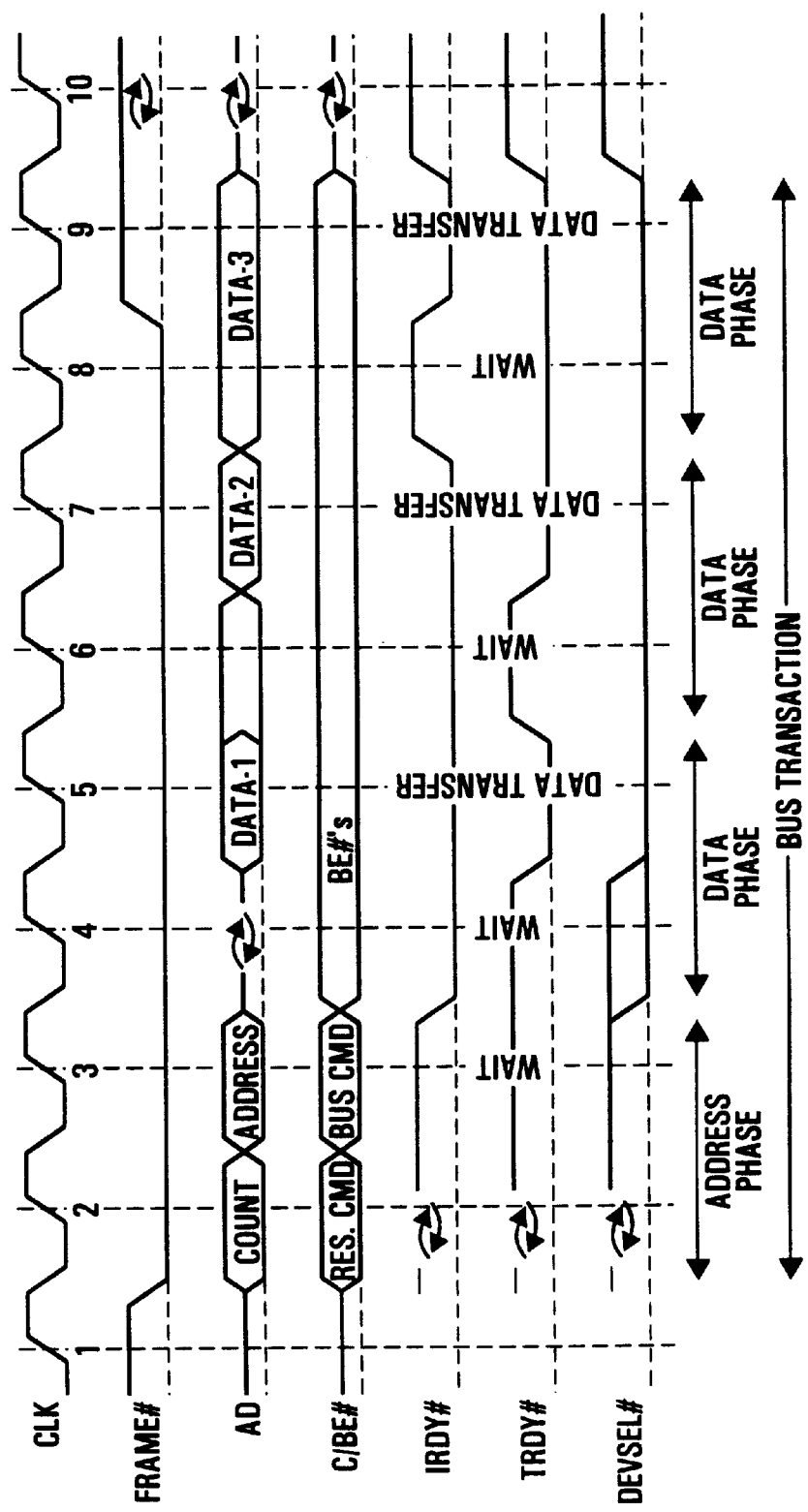
FIG. 4A is a timing diagram illustrating a PCI bus read transaction incorporating a reservation command.

A reservation resource 220 can be reserved by a bus master 108 when a special bus command is received by the bridge 106. At this point, the reader may also want to refer to FIG. 4A. When the bus master 108 desires to reserve a reservation resource 220 for read transactions from the target memory 104, the bus master 108 issues a first read transaction containing a reservation command (RSRV_COMMAND) for indicating a total number of bytes to be read from the target memory 104. The RSRV_COMMAND is a special PCI bus command represented by the command/byte enable (C/BE#) signals on the PCI bus and is presented to the bridge 106 on the first read transaction when a frame (FRAME#) signal is asserted to indicate the beginning of a transaction, as shown at clock 2 of FIG. 4A. The reservation command also includes a count on the AD[31:0] lines to indicate the number of bytes desired. From clock 3 forward, the PCI transaction continues as normal: the type of PCI transaction is provided on the C/BE# lines along with a starting address on the address/data (AD) lines; and data is transferred when available (as shown in clocks 5, 7 and 9). Thus, the count (clock 2) and starting address (clock 3) indicate a range of memory to read. It is understood that there are alternative ways to indicate this range for reserving a buffer, such as by indicating a starting address and ending address. These alternatives are contemplated for the reservation command.

Figure 4B:
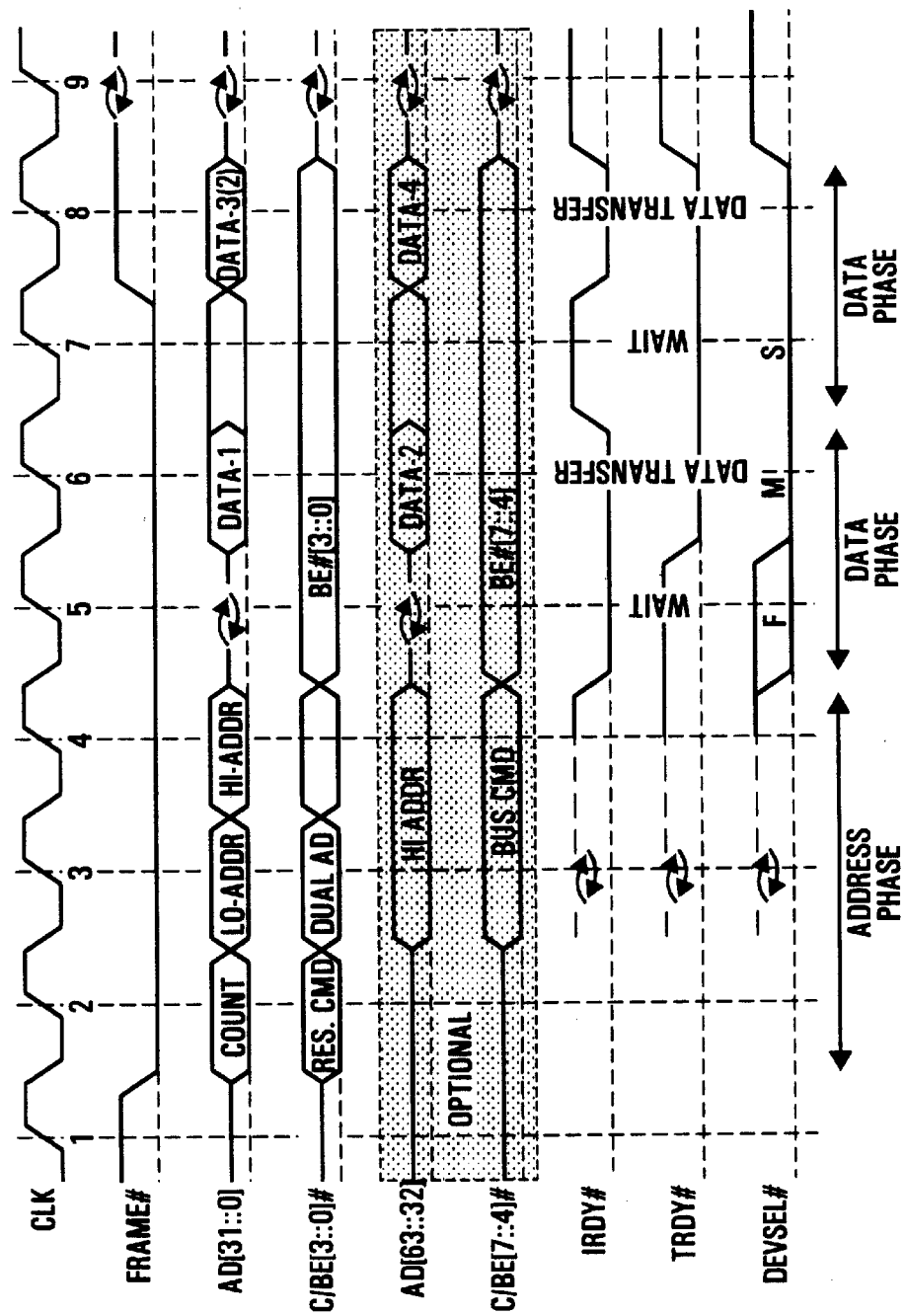
FIG. 4B is a timing diagram illustrating a PCI bus read transaction with a 64bit address incorporating a reservation command.

For 64 bit addressing, illustrated in FIG. 4B, the RSRV_COMMAND precedes the dual address command and actual read command. More details on the dual address command is found in the PCI Specification referred to above.

When the bridge 106 receives the RSVR_COMMAND, the registers in the reservation information block 208 are initialized. The starting address is stored in the RSRV_BASE_ADDR, the ending address is determined by adding the starting address to the total byte count, which is incremented by one and stored in the RSRV_LIMIT_ADDR. One of the three 128-byte buffers is initialized by storing the starting address in the BUFF_START_PNTR and the buffer ending address in the BUFF_LIMIT_PNTR. Also, the buffer state and prefetch flag for each of the three buffers is initialized.

Once the reservation is placed, the bus master 108 may disconnect from the bridge 106 and reconnect later to resume the operation without reissuing the RSVR_COMMAND. Thus, in this alternative, a single PCI bus command indicates the number of bytes to be transferred. The penalty for this additional information is only one clock cycle, since once the buffer is reserved, the data transactions proceed as normal.

Figure 3A:
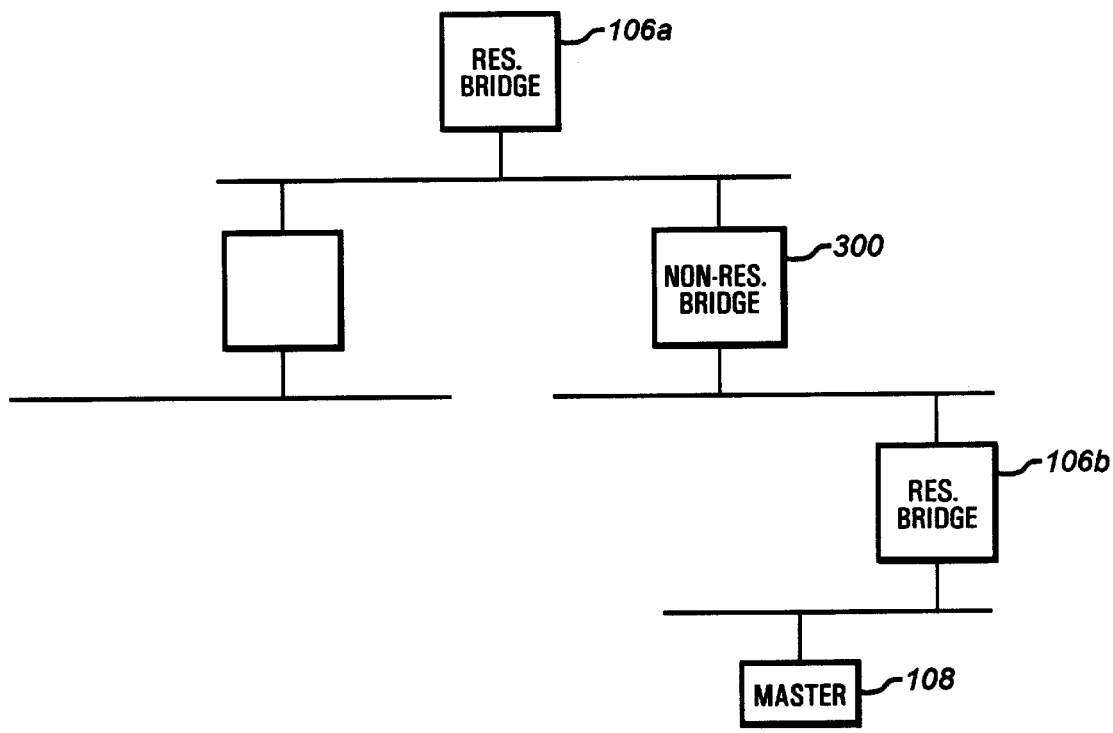
FIG. 3A is a block diagram illustrating an exemplary hierarchy of buses with a nonreservation bridge coupled between two reservation bridges according to the preferred embodiment.
Figure 3B:
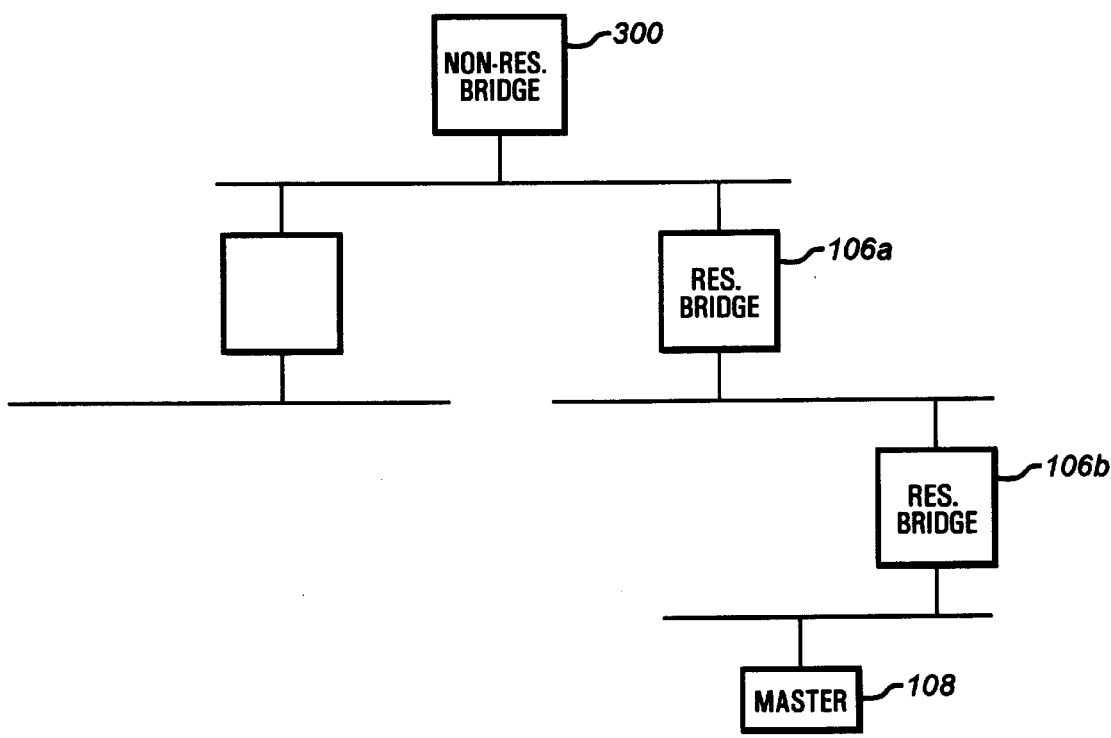
FIG. 3B is a block diagram illustrating an exemplary hierarchy of buses with a nonreservation bridge acting as a host bridge at the host top of the hierarchy.

The target does not receive the RSRV_COMMAND. However, intermediate bridges may receive the RSRV_COMMAND from downstream bridges. If a hierarchy of bridges is present, as illustrated in FIGS. 3A and 3B, each bridge supporting the RSRV_COMMAND may pass the reservation upstream. In the configuration of each bridge, a configuration bit 214 (FIG. 2A) is cleared if the upstream bridge does not support buffer reservations, otherwise the bit is set by configuration software during computer initialization operations and the reservation will be passed upstream. FIG. 3A shows an example hierarchy of bridges where a bridge 300 is a non-reservation bridge sandwiched between two bridges 106a and 106b which support buffer reservations. In this example, since the bridge 300 does not support buffer reservations, the configuration bit in bridge 106b would be cleared so that the RSRV_COMMAND would not be forwarded to the non-reservation bridge 300. Thus, even though bridge 106a supports buffer reservations, this feature is not utilized in bridge 106a.

FIG. 3B illustrates an example hierarchy of bridges in which a top-most bridge 300 does not support buffer reservations, but a lower two bridges 106a and 106b do support it. In this example, since the bridge 300 does not support buffer reservations, the configuration bit in the bridge closest to the non-reservation bridge, bridge 106a, would be cleared so that the RSRV_COMMAND would not be forwarded to the non-reservation bridge 300. The configuration bit 214 in bridge 106b is set so that the RSRV_COMMAND received by bridge 106b is forwarded to bridge 106a. Thus, a non-reservation bridge acts to cut off the benefits of buffer reservations when implemented with the RSRV_COMMAND.

Referring now to a second alternative reservation mechanism, illustrated in FIG. 2B, the bridge 106 contains an address decode block 212b for decoding operations to a special address. In the memory address map of the computer system 100, this special memory address is allocated for this reservation mechanism. Write operations to this special address are interpreted as reservation operations by the bridge 106. When the bus master 108 desires a buffer reservation for a read operation, it first executes a 2–3 32-bit (Dword) burst write to the special address. The bridge 106 intercepts the write operation and stores the command in a reservation mailbox 216. The first Dword is the total number of bytes the bus master 108 intends to read. The second Dword is the least significant 32 bits of the starting address. If 64-bit addressing is utilized, then a third Dword is written containing the most significant 32 bits of the starting memory address. If only two Dwords are written, the bridge assumes the most significant 32 bits are zero. The bridge 106 intercepts and claims the write operation to the mailbox register 216 by asserting a device select (DEVSEL#) signal since the address is not assigned to any devices on the secondary bus 112. When the bridge 106 receives the transaction, it reserves a buffer if one is available, and stores the address, length and other information in the mailbox 216 for forwarding to other intermediate bridges, if necessary. When the reservation is placed, the reservation information block is also initialized as described above. Thus, in this alternative, a write to a special address indicates the starting address and number of bytes to be transferred. This information is utilized by the bridge 106 to prefetch data for the requesting master 108.

If a hierarchy of bridges is present as illustrated in FIGS. 3A and 3B, each bridge supporting buffer reservations may pass the reservation information upstream. In the configuration of each bridge, the topmost bridge in the hierarchy is disabled from forwarding the reservation. FIG. 3A illustrates a hierarchy of bridges where a bridge 300 is a nonreservation bridge sandwiched between two bridges 106a and 106b which support buffer reservations. In this example, since write transactions to global memory address are used to pass the reservation information between the bridges, the configuration bit and bridge 106b would be set so that the reservation would be forwarded to the non-reservation bridge 300 and passed to the reservation bridge 106b. The non-reservation bridge 300 does not recognize the difference between a normal memory transaction and a reservation write transaction. If the bridge 106a was coupled to the memory 104 on its primary side, the configuration bit and bridge 106a would be set to disable forwarding of the reservation information to memory. Thus, each bridge capable of supporting buffer reservations receives the reservation information.

FIG. 3B illustrates a hierarchy of bridges in which a topmost bridge 300 does not support buffer reservations, but a lower two bridges 106a and 106b do support it. In this example, since the bridge 300 is the topmost bridge and because it does not support buffer reservations, the configuration bit in bridge 106a would be cleared to disable forwarding of the reservation information. The reservation is passed between the bridges 106a and 106b. Thus, if a non-reservation bridge is located at the top level, the reservation bridge below the nonreservation bridge is disabled from forwarding the reservation. One advantage of this method over the first alternative is that script-driven bus masters can readily implement the memory write transaction with little modification.

Both alternatives allow the bridge 106 to prefetch data in longer, more efficient transactions. By utilizing the buffer reservation, unused prefetched data is avoided since only the data requested is prefetched. Coherency problems between the memory 104 and data stored in the buffers 206 and 210 are also avoided since only requested data is prefetched and it can be assumed that no bus master would use this data until the requestor completes the transfer. Thus, data prefetched according to the preferred embodiment can be held and considered valid until the transfer completes.

Read operations may be performed by the bridge 106 with a technique known as delayed transactions. More details on delayed transactions are found in the PCI Specification incorporated above and in the background section of this specification. Briefly though, delayed transactions are a method of termination and retry used by PCI bridges and PCI I/O controllers which cannot complete a data transaction within a certain specified time. Instead of a first requesting bus master waiting for a slow I/O controller or bridge to respond, the I/O controller or bridge may force the first requesting bus master off the bus so that other bus masters are allowed to use the bus bandwidth that would normally be wasted holding the first bus master in wait states. A delayed transaction normally progresses to completion in three phases: a request by a bus master; completion of the request by a target; and a completion of the transaction by the bus master.

In the nomenclature of the PCI bus, a delayed read request is a transaction that must complete on the destination bus before completing on the originating bus and can be an I/O read, configuration read, memory read, memory read line, or memory read multiple command. Referring to FIG. 1A, if the bus master 108 requests data from memory 104, the secondary bus 112 is the originating bus and the primary bus 110 is the destination bus. Once a request has been attempted on the destination bus, it must continue to be repeated until it completes on the destination bus. Until that time, the delayed read request is only a request and may be discarded at any time to prevent bus deadlock or improved performance since the bus master 108 must repeat the request later. A delayed read completion is a read transaction which has completed on the destination bus and is now moving toward the originating bus to complete. The delayed read completion contains the data requested by the bus master 108 and the status of the target (memory 104). Once the delayed read request is executed on the destination bus it becomes a delayed read completion.

An example of a simple delayed transaction without the buffer reservation mechanisms is helpful to illustrate its effect on the buffers region 204. It is noted that delayed transactions may be used with or without the buffer reservation mechanisms herein disclosed. Also, the buffer reservation mechanisms may be used with or without delayed transactions, but is it assumed they will be used together for maximum performance.

FIG. 1A is used as an example. During a first phase, the bus master 108 generates a memory read transaction on the secondary bus 112. The bridge 106 decodes the transaction and, recognizing that the main memory is on the primary bus, claims the transaction by asserting the DEVSEL# signal, latches the transaction information required to complete the access, and terminates the request using conventional PCI retry techniques. The latched request information is referred to as a delayed request, or more specifically in this example, a delayed read request. According to PCI convention, the bus master 108 must repeat the transaction. Meanwhile, using the latched transaction information, the bridge 106 generates a memory read transaction on the primary bus 110. If the target (main memory 104) is not ready, it can also force another delayed transaction by issuing a retry to the bridge 106. However, assuming the memory 104 does not issue a retry, the memory 104 processes the request and the bridge 106 receives the completion status and the requested data into one of its buffers 204. If the delayed request was a write operation, the bridge 106 would obtain the completion status from the main memory 104. The result of completing the delayed request on the destination bus (primary bus 110) produces a delayed completion, which consists of the latched information of the delayed request and the completion status and data. The bridge 106 stores the data and completion status in the buffer region 204 until the bus master 108 repeats the initial request.

During the third phase, the bus master successfully rearbitrates for the bus and reissues the original memory read request. The bridge 106 decodes the request, claims the operation and provides the data to the bus master 108. At this point, the delayed completion is retired and the transaction has completed. The status returned to the bus master 108 is exactly the same as the bridge 106 obtained from the target (memory 104) when it executed the read transaction, i.e., master-abort, target-abort, parity error, normal, or disconnect.

By using the delayed transaction technique in combination with the buffer reservation mechanisms herein disclosed, read operations between bus masters and bus slaves can be performed more efficiently than before.

Managing the buffer region 204 is desirable to obtaining efficient data transfers. The basic component of the buffer region 204 is the 128-byte buffer, referred to generically as a buffer 500 in FIG. 5A. Read prefetch data and posted write data may both be stored in the bridge 106 (in different buffers), but the read prefetch data cannot become valid until after the posted memory write completes. As data is written into the buffer 500, a BUFF_IN_PNTR is incremented to indicate the next address. Data is emptied from the buffer 500 beginning at the address indicated by BUFF_OUT_PNTR. The BUFF_VALID_PNTR indicates which region of the buffer 500 is valid. Addresses between BUFF_OUT_PNTR and BUFF_VALID_PNTR are valid addresses. When a delayed read request is started, the BUFF_IN_PNTR and BUFF_OUT_PNTR are initialized to bits 4-2 of the PCI transaction address. As each Dword of data arrives, it is stored at the address indicated by the BUFF_IN_PNTR and the pointer is then incremented. If there are no preceding unexecuted posted memory write addressing targets on the destination bus, the BUFF_VALID pointer can be incremented when BUFF_IN_PNTR is incremented. If there is a preceding posted memory write, then BUFF_VALID_PNTR is updated after the write completes. As the bus master 108 takes data from the buffer, BUFF_OUT_PNTR is incremented after each Dword is removed.

FIG. 5B illustrates how the reservation resource buffer 206 is constructed. The reservation buffer 206 has a beginning address, as indicated by RSRV_BASE_ADDR and ending address, as indicated by RSRV_LIMIT_ADDR. The reservation buffer 206 is comprised of three 128-byte data buffers (of the type shown in FIG. 5A. As a read transaction progresses, these three buffers are reused so as to simulate one long buffer of length RSRV_LIMIT_ADDR minus RSRV_BASE_ADDR. Each individual buffer has a starting address, as indicated by BUFF_START, and an ending address as indicated by BUFF_LIMIT.

Figure 6A:
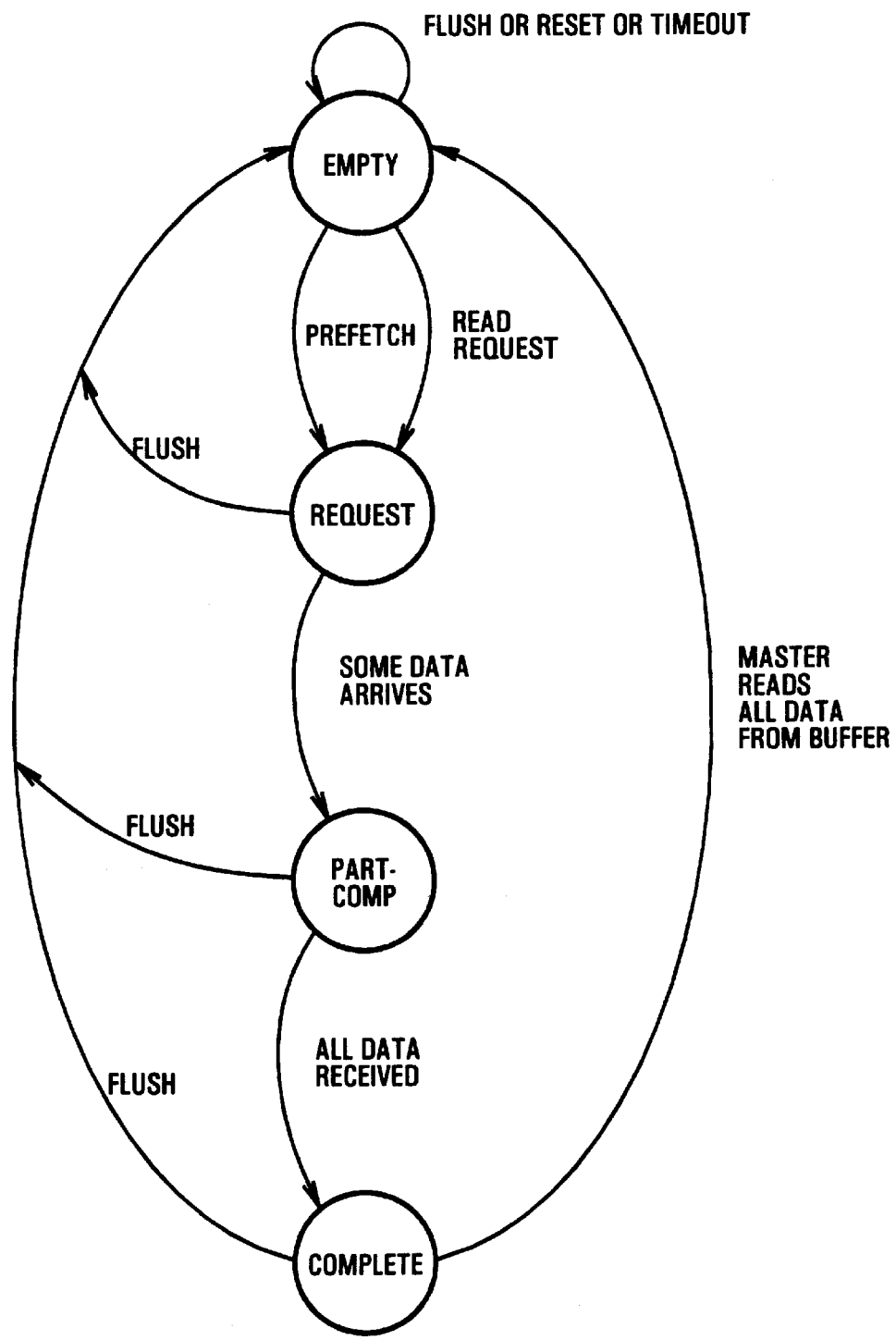
FIG. 6A is a state diagram illustrating buffer states according to the preferred embodiment.

The state of the buffer is indicated by two variables: BUFF_STATE and PREFETCH_FLAG. The PREFETCH_FLAG is used to distinguish between a prefetch operation and an actual read request. The state of the data stored in the buffers is illustrated in FIG. 6A. The state of the buffer is designated as EMPTY after a system reset, a buffer timeout or buffer flush. When the buffer is designated EMPTY it is available for allocation. If the buffer is servicing a read request or is performing a read prefetch, the buffer is designated as REQUEST. Once some data begins to arrive into the buffer, the state transitions from REQUEST to PART_COMP. Once all the data has been received, the state of the buffer transitions from PART_COMP to COMPLETE. If the buffer's state is REQUEST, PART_COMP or COMPLETE and the buffer is flushed, the state returns to EMPTY. If the buffer is designated as COMPLETE and the bus master reads all of the data from the buffer, the state is changed from COMPLETE to EMPTY.

For the reservation algorithm, the buffer is only flushed when the last DWORD of data is removed from the buffer. However, flushing of prefetch data is done from time to time with the default or conservative algorithms to guarantee that a bus master is never given stale data. For this reason, it is important to track the state of the buffers.

Prefetch data refers to the remnant of a buffer which was filled with a real delayed read request from a master, but when the master reconnected only part of the data was taken before the master disconnected. A master's prefetch data is flushed under the following conditions: (1) the master attempts a read from an address which is not sequential from that master's last read; (2) the CPU 102 does a write transaction which might affect this master such as an I/O write to a secondary bus target, a memory write to the general secondary memory range register, or a memory write to the slot-specific memory range register for this master; and (3) a secondary bus master does a write transaction which might affect this master such as an I/O write to a secondary bus target, a memory write to the general secondary memory range register, a memory write to the slot-specific memory range register for this master, or a CPU 102 write to any configuration register.

The states for the PREFETCH_FLAG are described with reference to FIG. 6B. When the BUFF_STATE is designated REQUEST, PART_COMP or COMPLETE, the PREFETCH_FLAG indicates whether the read is a prefetch or an actual REQUEST. When the PREFETCH_FLAG is set, a prefetch operation is in progress, while when the PREFETCH_FLAG is cleared a real REQUEST is in progress. The transitions from the set and clear states are indicated in the following equations:

A=(prefetch) OR (after master read AND BUFF_STATE=(PART_COMP OR COMPLETE));

B=(flush AND BUFF_STATE=(REQUEST, PART_COMP OR COMPLETE));

C=(master read transaction AND delayed read request) OR (prefetch complete AND BUFF_STATE=EMPTY) OR (flush AND BUFF_STATE=COMPLETE) OR (real delayed read request);

=D (master read transaction AND delayed read request) OR (prefetch complete AND BUFF_STATE=EMPTY);

A buffer 204 is only available for a new REQUEST if it is EMPTY or it contains prefetch data and there is not already a prefetch in progress for that buffer. When a bus master 108 attempts a read and the bridge 106 initiates a delayed read request, BUFF_STATE is changed to REQUEST, and PREFETCH_FLAG is cleared. If the read operation is initiated by a bridge 106 prefetch, then BUFF_STATE is changed to REQUEST, and PREFETCH_FLAG is set.

When the first data arrives BUFF_STATE is changed to PART_COMP. If the master repeats the read transaction and the state is PART_COMP or COMPLETE, read data is provided to the bus master 108. If the bus master 108 does not take all of the data before disconnecting from the bridge 106, PREFETCH_FLAG is set to indicate that the remainder of the data in the buffer 204 is now considered to be prefetched data, but the state remains unchanged. If the bus master 108 takes the last data, i.e., (BUFF_OUT_PNTR>=BUFF_IN_PNTR > after the read) when the state is COMPLETE, the state is changed to EMPTY.

If a flush event occurs for the buffer 204 and its PREFETCH_FLAG is set, and the state is designated REQUEST, PART_COMP or EMPTY, a prefetch is currently in progress, so the state is changed to EMPTY, but the PREFETCH_FLAG remains set until the pending prefetch is complete. The buffer 204 cannot be reused for another prefetch until the PREFETCH_FLAG is cleared. If a flush event occurs for the buffer 204 and its PREFETCH_FLAG is set, and the state is designated COMPLETE, the state is changed to EMPTY and the PREFETCH_FLAG is cleared.

If a real delayed requested needs the buffer 204 while the PREFETCH_FLAG is set, the new request is given the buffer. The PREFETCH_FLAG is cleared (to cause incoming prefetch data to be discarded) and the state is changed to REQUEST.

When prefetch data arrives for the buffer 204 and PREFETCH_FLAG is cleared, the data is discarded (the buffer has been reused for a real request). When prefetch data arrives for a buffer 204 and the state is EMPTY, the data is discarded (the buffer is flushed). When the last prefetch data arrives, the PREFETCH_FLAG is cleared and the buffer 204 is available to be reused.

Three prefetch and flush algorithms are implemented in the bridge 106: default algorithm, conservative algorithm, and reservation algorithm. The default algorithm should be applicable to most bus masters. The conservative algorithm prefetches less and flushes more, but is implemented only in the case where the default algorithm does not work for a particular bus master. The reservation algorithm is used by more sophisticated bus masters which are capable of initiating the reservation mechanism.

Now referring to FIGS. 7A through 7H, the prefetch and flush algorithms are described according to the preferred embodiment. It is understood that the bridge 106 performs various processes related to read and writing data, however, for simplicity these steps have been omitted. Further, although the steps relating to write posting are not shown, it is understood that the bridge performs these operations in conjunction with the read prefetch and flush processes described herein.

Figure 7A:
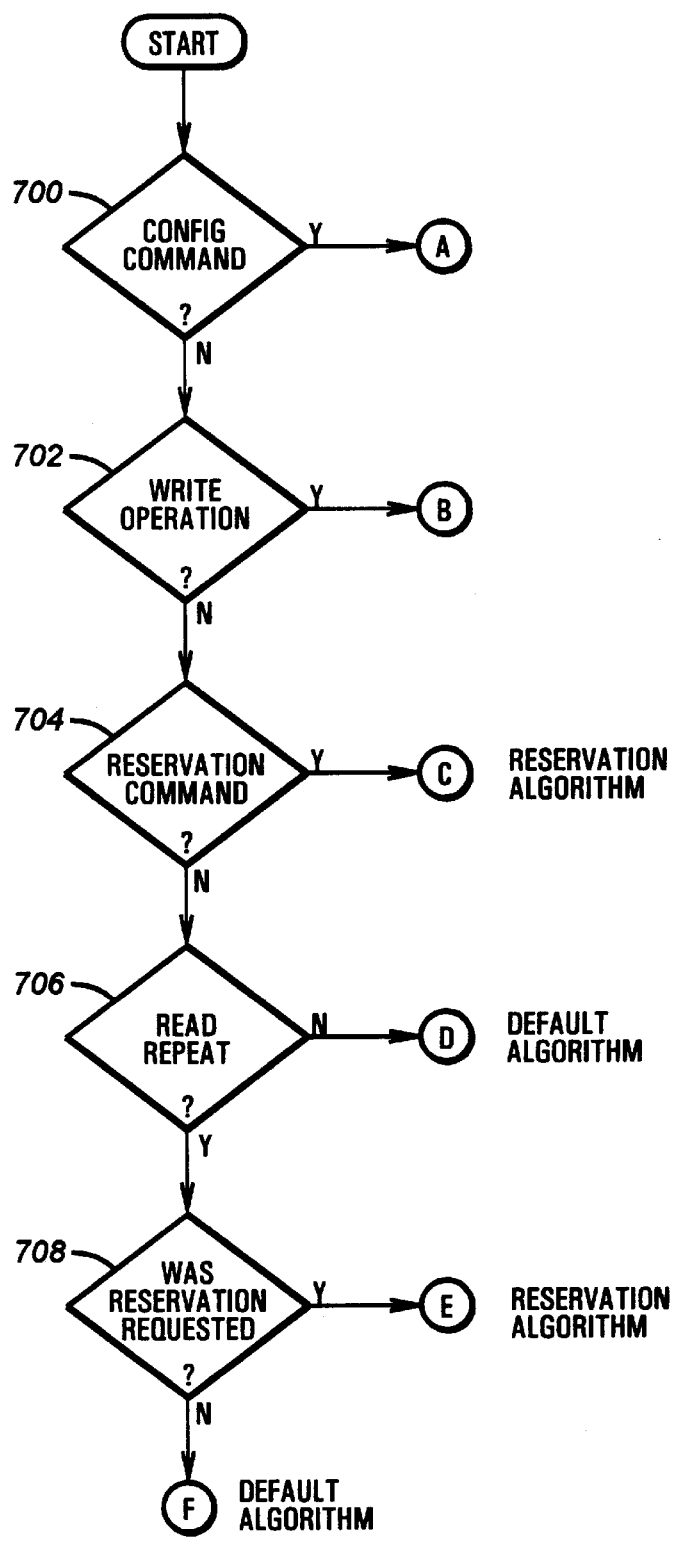
FIGS. 7A–7H are flow diagrams illustrating the default, conservative and reservation algorithms according to the preferred embodiment.
Figures 7B, 7C:
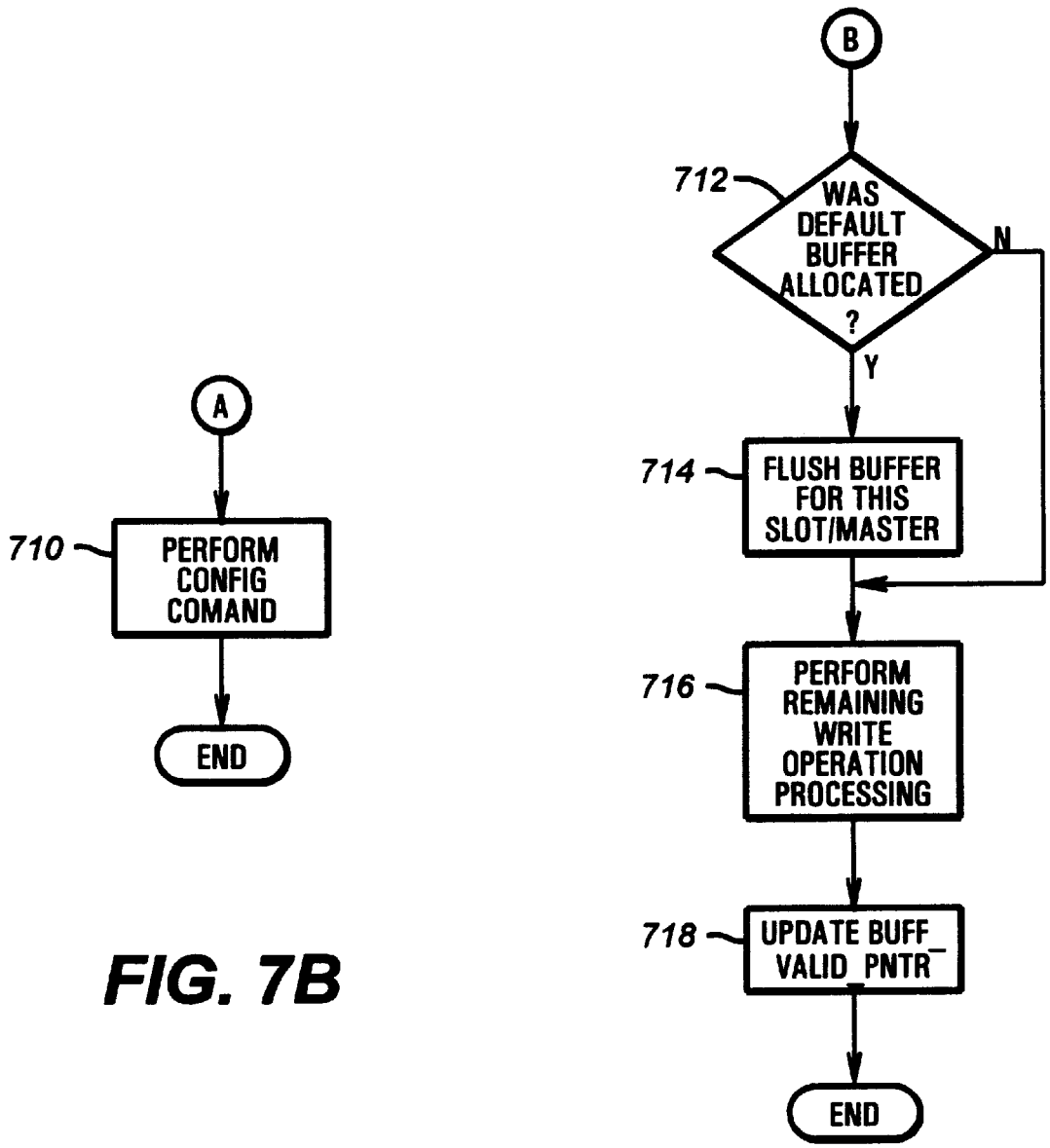
Figure 7D:
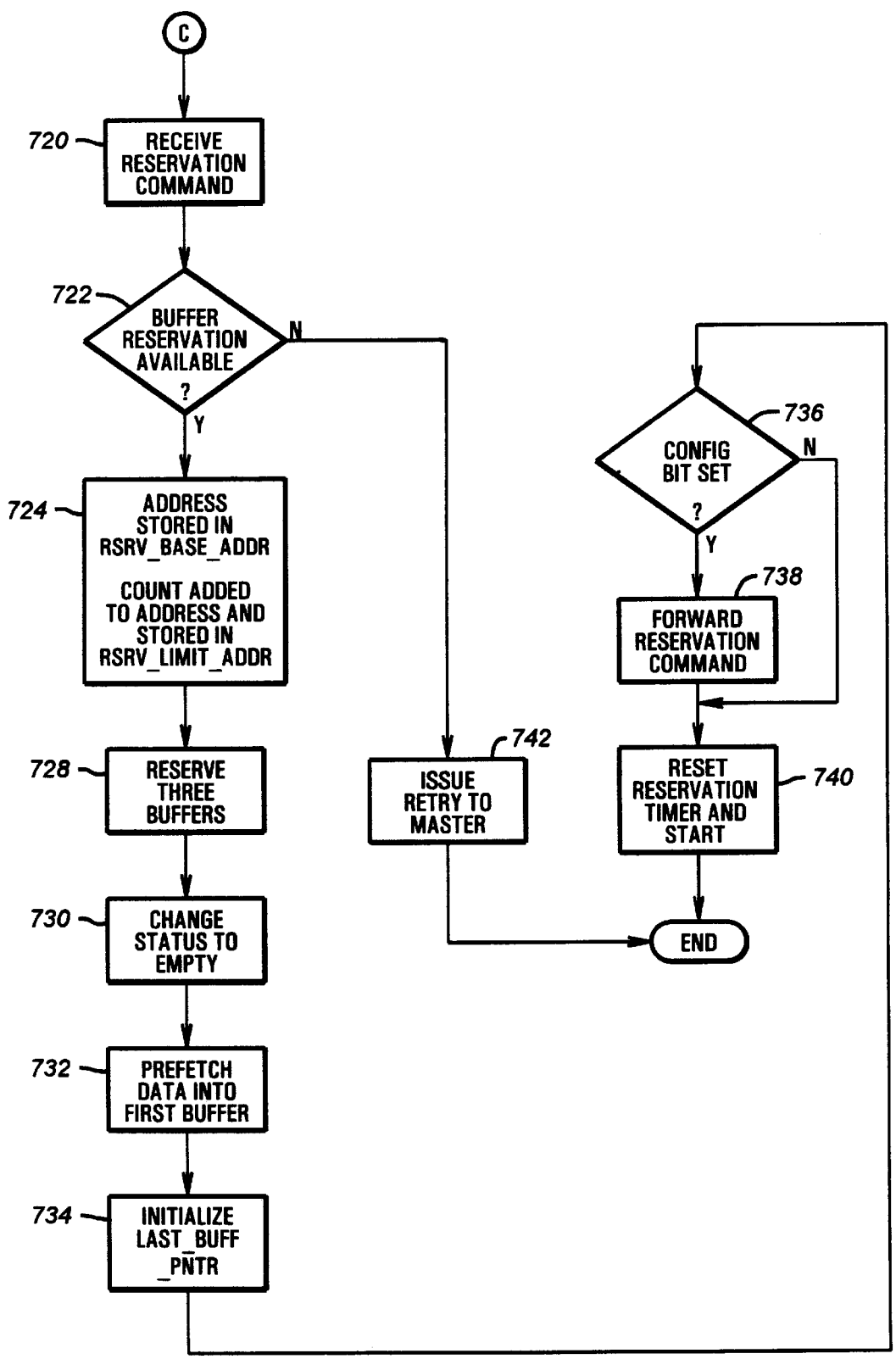
Figure 7E:
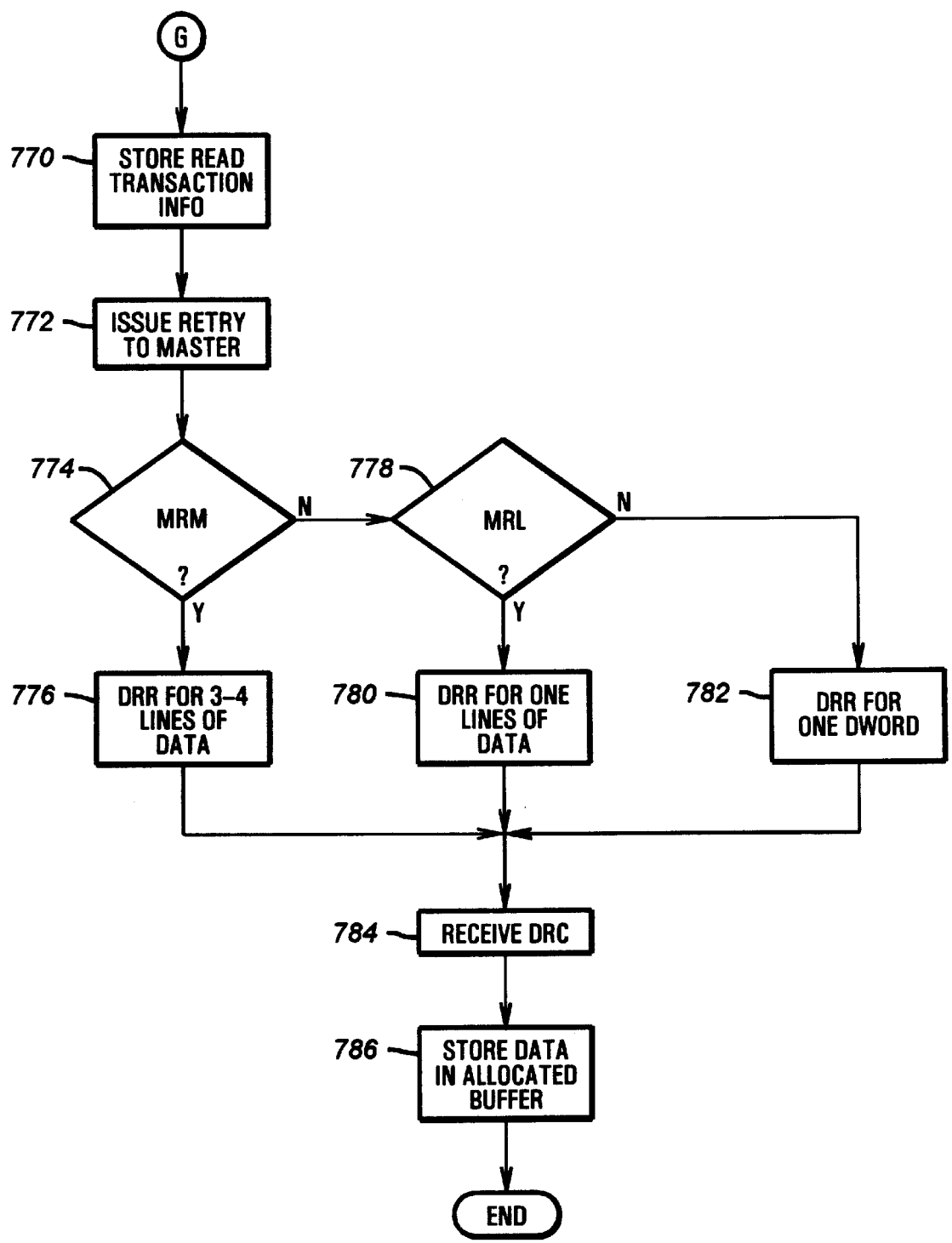

The prefetch and flush algorithms begin at FIG. 7A with the receipt of a bus transaction on the secondary bus interface 202. At step 700 (FIG. 7A), it is determined whether a configuration command was received. If so, control proceeds to step 710 (FIG. 7B) to complete the command, otherwise control continues to step 702. At step 702 it is determined if a write operation has been issued to the bridge 106. If so, control proceeds to step 712 (FIG. 7C) where it is determined if the write operation affects one of the default buffers that have been allocated. If a bus master 108 is allocated one of the default buffers 210, and a write operation is performed to the bus master 108, such as a configuration write or command, then it is possible that a new process has been initiated, in which case any prefetched data contained in the default buffer 210 is subject to being stale or non-conforming. In such a case, the buffer is said to be affected by the write command. If such is the case, then control proceeds to step 714 where the default buffer 210 corresponding to the slot or master affected by the write operation is flushed. Control then proceeds from step 714 to step 716. If it is determined at step 712 that the write command does not affect any default buffers 210, then control proceeds from step 712 to step 716. At step 716, the remaining write operation processing is handled, including receiving any write data into the write posting buffers and updating the BUFF_VALID_PNTR (at step 718). The BUFF_VALID_PNTR is only updated for the default and conservative algorithms. The routine then terminates, returning to whatever process called it.

Returning to step 702, if it is determined that the operation is not a write operation then control proceeds to step 704 where it is determined if the operation is a reservation command. If so, control proceeds to step 720 (FIG. 7D) where the reservation command is received by the bridge 106. Control then proceeds to step 722 where it is determined if one of the reservation resources 220 is available for this request. If not so, then control proceeds to step 742 where a retry is issued to the requesting bus master, and the routine ends. If a reservation resource 220 is available, then control instead proceeds from step 722 to step 724 where the reservation resource registers are initialized with data (i.e., address and count) contained in the reservation command. Control then proceeds to step 728 where three 128 byte buffers are allocated to this request and to step 730 where the status for these buffers is changed to EMPTY. Control then proceeds from step 730 to step 732 where the bridge 106 prefetches three to four lines of data into a first 128-byte buffer of buffer 206. Control then proceeds to step 734 where the last buffer pointer (LAST_BUFF_PNTR) is initialized to indicate which buffer will be written to next.

Control then proceeds to step 736 where it is determined if the forwarding configuration bit is set. If set, then control proceeds to step 738 where the reservation command is forwarded upstream to any upstream bridge. Control then proceeds from step 738 to step 740. If at step 736, the configuration bit is not set, then control proceeds directly to step 740. At step 740, a reservation timer is reset and started. The reservation timer cancels the reservation if after a certain amount of time, such as 25 ms, 50 ms or 100 ms, the reservation resource has not been accessed. It is assumed that the data will be stale after this period of inactivity. The routine then ends.

Figure 7F:
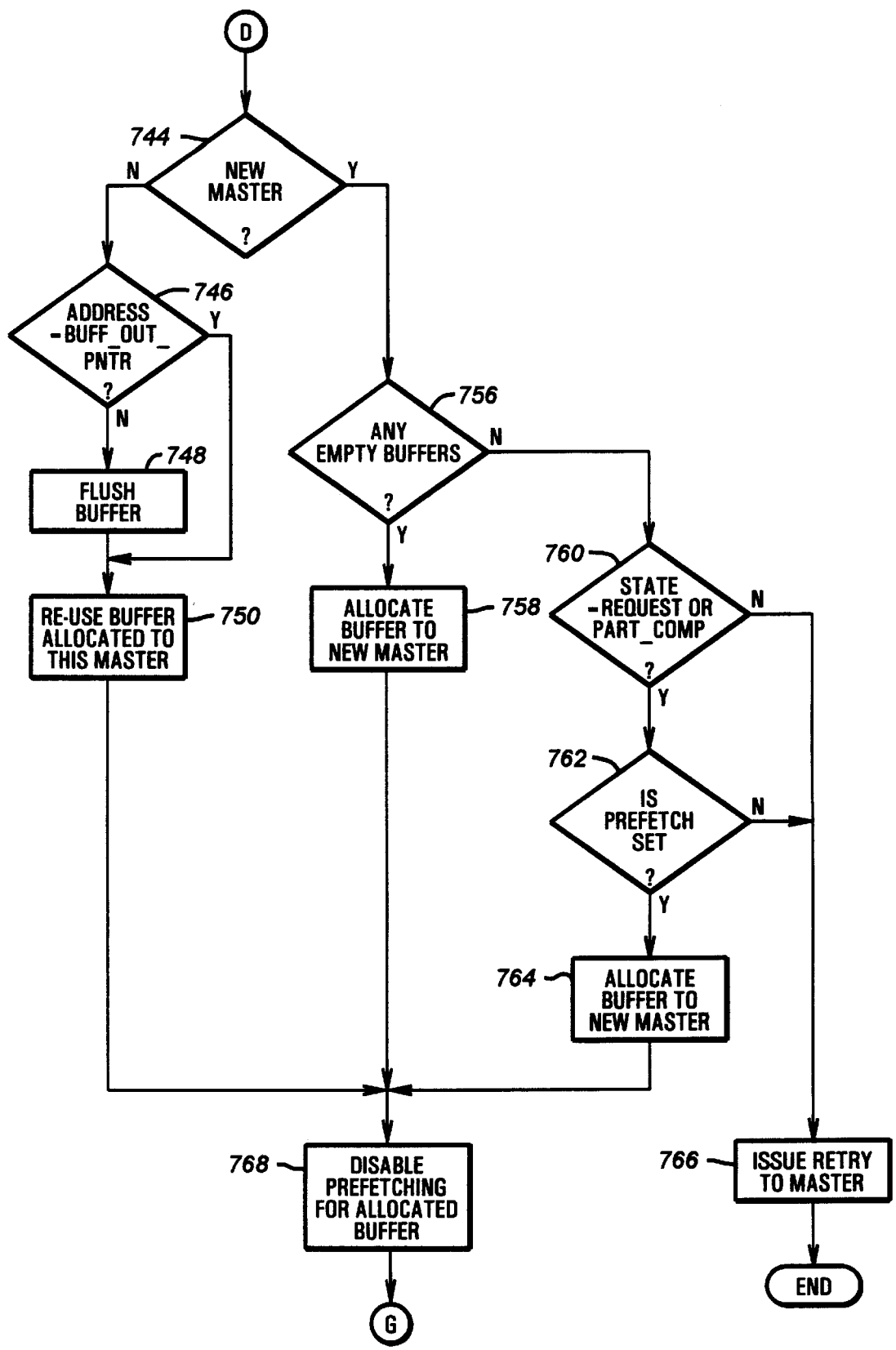
Figure 7G:
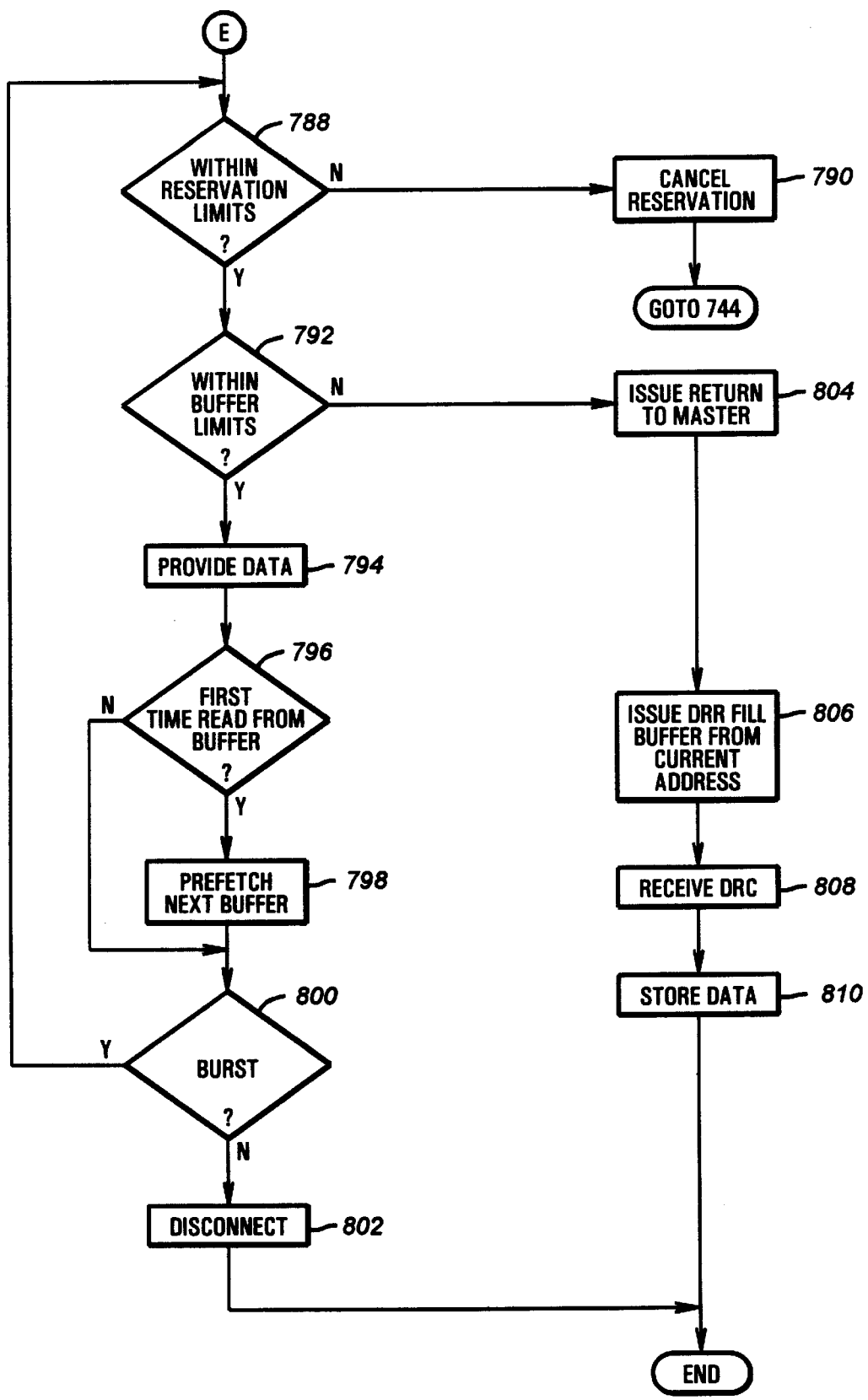

Returning to step 704, if it was determined that the operation is not a reservation command then control proceeds to step 706 where it is determined if the operation is a read retry from a bus master. If not so, then the operation is deemed to be a first read operation and control proceeds to step 744 (FIG. 7F).

At step 744 it is determined if the requesting bus master already has a default buffer 210 allocated to it or is a new bus master. If it is determined that this is not a new master then control proceeds to step 746 where it is determined if the requested address is equal to the address pointed to by the BUFF_OUT_PNTR. If so, then control proceeds to step 750. If not so, then control proceeds to step 748 where the allocated default buffer 210 is flushed because the master has begun reading from a new, not contiguous address. Control then proceeds to step 750 where the default buffer 210 is reallocated to this master and the buffer registers are initialized as described above. Control then proceeds to step 768.

If at step 744 it was determined that this is a new master, then control proceeds to step 756 where it is determined if any one of the default buffers 210 currently are designated as EMPTY. If so, then control proceeds to step 758 where one of the EMPTY default buffers 210 is allocated to the new master. From step 758, control proceeds to step 768. If not so, then control proceeds to step 760 where it is determined if any default buffers 210 are currently designated as REQUEST or PART_COMP. If so, then control proceeds to step 762 where it is determined if the PREFETCH_FLAG is set and if so, then control proceeds to step 764 where the default buffer 210 is allocated to the new master. Control then proceeds from step 764 to step 768. If at steps 760 and 762, the determinations are negative, then control proceeds to step 766 where the bus master is asked to retry the operation at a later time.

At step 768, control disables prefetching for the newly allocated or re-allocated default buffer 210. Control then proceeds to step 770 (FIG. 7E) where the read request information is stored. Control then proceeds to step 772 where the bus master is asked to retry the operation while the bridge 106 gathers the requested data from the target on the destination bus. Control then proceeds to step 774 where it is determined if the read request was a memory read multiple command. If so, then control proceeds to step 776 where the bridge 106 reads three to four lines of data from main memory 104. Control then proceeds from step 776 to step 784. If at step 774 it is determined that the read command was not a memory read multiple, then control proceeds to step 778 where it is determined if read command was a memory read line command. If so, then control proceeds to step 780 where the bridge 106 reads one line of data from main memory 104 and control then proceeds to step 784. If at step 778 if is determined that the command was not a memory read line command, then control proceeds to step 782 where the bridge 106 reads one Dword of data from main memory 104 and then control proceeds to step 784.

At step 784 the bridge 106 receives the data from main memory 104 and at step 786 the bridge 106 stores the received data in the allocated buffer and ends. The routine will later be called when the requesting bus master retries the operation.

Returning now to step 706, if it is determined that the operation is a read retry operation from a bus master then control proceeds to step 708 where it is further determined if this bus master has previously requested a buffer reservation. If so, then control proceeds to step 788 (FIG. 7G) where it is determined if the address for the retry read operation is within the limits of the reservation resource 220. If not so, then control proceeds to step 790 where the reservation is canceled and control proceeds to step 744 (FIG. 7F) to begin a read operation using the default algorithm. If at step 788 it was determined that the read operation is within the reservation limits then control proceeds to step 792 where it is next determined if the read address is within one of the three buffer limits. If so, then control proceeds to step 794 where the requested Dword of data is provided to the bus master. From step 794, control proceeds to step 796 where it is determined if this is the first time the bus master has read from this particular 128 byte buffer.

If this is the first time, then control proceeds to step 798 where the bridge 106 prefetches data into the next buffer as indicated by the LAST_BUFF_PNTR. The buffers 206 are filled according to a least recently used algorithm. Once data is read from a buffer for the first time, the least recently used buffer is used for this next data prefetch operation. So at this point, the bus master is reading from one buffer, a next buffer holds prefetched data, and another buffer holds previously prefetched data. So even if the bus master needs to back-up or step back from it's current address, the data will still likely be present in the previously prefetched buffer. Control proceeds from step 798 to step 800. If this is not the first time, then control proceeds from step 796 to step 800 where it is determined if the read operation by the bus master is a burst read. If so, then control proceeds back to step 788 to provide additional data. If not so, then control proceeds to the end.

If at step 792 it was determined that the read operation was not within the buffer limits then control proceeds to step 804 where the bridge 106 forces the master to retry the operation while the bridge 106 fetches the requested data. Control then proceeds from step 804 to step 806 where the bridge reads the data from main memory 104, proceeds to step 808 where it receives the data, and proceeds to step 810 where the received data is stored in the buffer 206 and the bridge 106 then awaits for the bus master to retry the read operation.

Figure 7H:
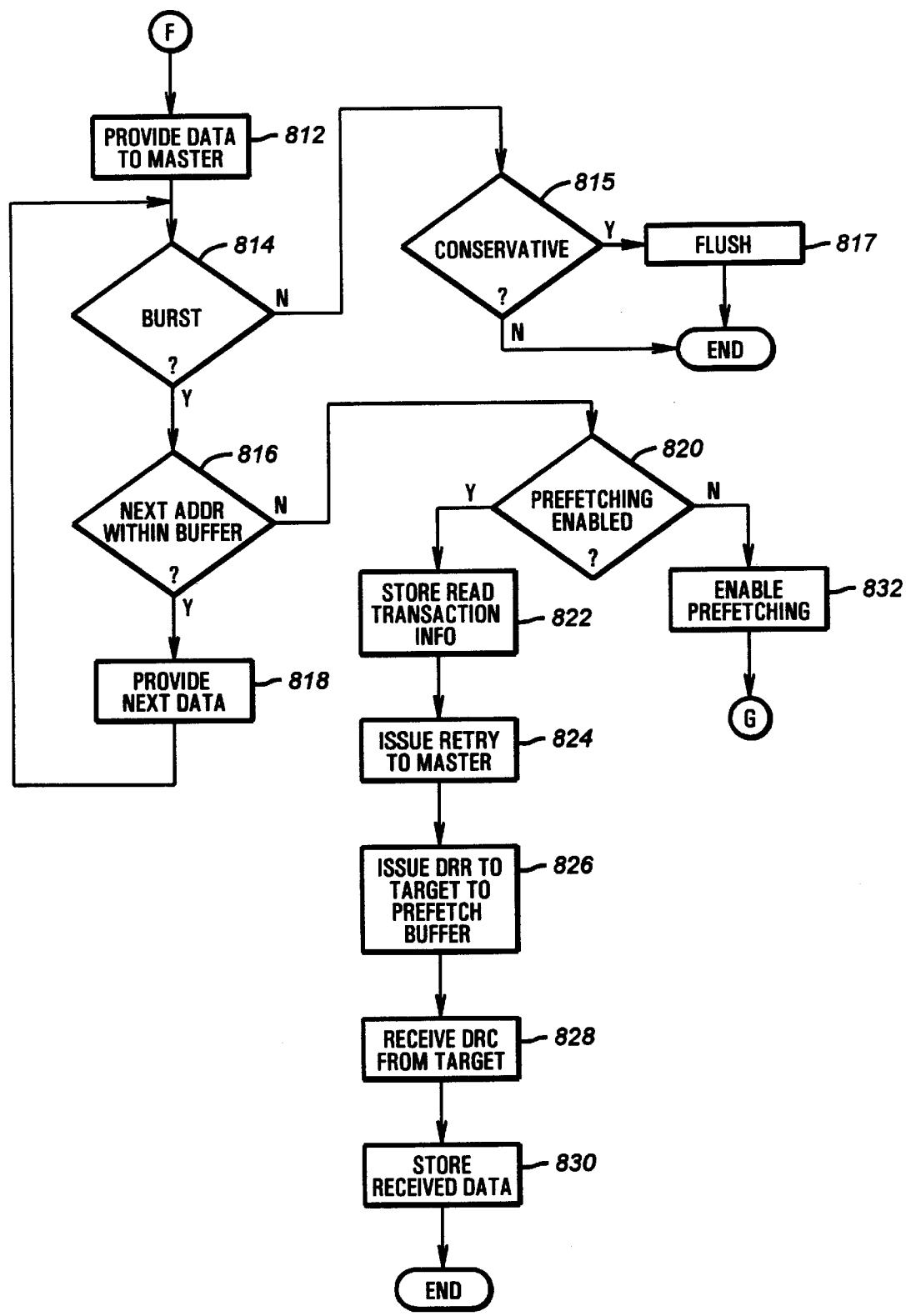

Returning to step 708, if it was determined that there was not a reservation resource previously requested for this read operation then control proceeds to the default algorithm at step 812 (FIG. 7H).

At step 812, the requested data is provided to the bus master from one of the default buffers 210. Control then proceeds to step 814 where it is determined if the read operation is a burst operation. If not so, then processing continues to step 815 where it is determined if the conservative algorithm is selected. If so, then control proceeds to step 817 where the buffer is flushed. If the conservative algorithm is not selected, then control proceeds to the end. If at step 814 a burst operation is in progress, then control proceeds to step 816 to determine if the next requested address is contained within the data buffer. If so, then control proceeds to step 818 where the data is provided to the bus master. Control then proceeds back to step 814 to provide additional data if requested. If at step 816 it is determined that the next requested address is not contained within the buffer, then control proceeds to step 820 where it is determined if prefetching has been enabled for this buffer. If not so, then control proceeds to step 832 where prefetching is enabled. Control then proceeds to step 770, as described above.

If at step 820 it is determined that prefetching has been enabled, then control proceeds to step 822 where the read transaction information is stored in the bridge 106. Control then proceeds to steps 824 and 826 where the bridge 106 issues a retry to the bus master and the bridge issues a read operation to main memory 104. From this point forward, prefetching is enabled for this bus master. At step 828 the bridge 106 receives the read data and at step 830 the bridge stores the received data into the buffer and waits for the bus master to retry the read operation.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:
   a main memory;
   a processor coupled to said main memory;
   a bus master, said bus master operable to provide a bus operation including a reservation command and a bus command; and
   a bus bridge coupled between said main memory and said bus master, said bus bridge having at least one assignable data buffer, said bus bridge operable to receive the bus operation and reserve a data buffer for the exclusive use of said bus master in response to said bus operation.

2. The computer system of claim 1, wherein said bus command includes a starting address and wherein said bus command and said reservation command together define an address range.

3. The computer system of claim 2, wherein said reservation command includes a count.

4. The computer system of claim 2, wherein if said bus command is a read operation
   said bus bridge fetches data according to the read operation and prefetches data according to said address range, the data being provided to the bus master when requested.

5. The computer system of claim 4, wherein when said bus master reads at a last address of the address range, said bus bridge cancels the data buffer reservation.

6. The computer system of claim 1, wherein said reservation command is received after a frame signal is asserted.

7. The computer system of claim 1, wherein the bus bridge and the bus master are coupled to a peripheral component interconnect (PCI) bus.

8. The computer system of claim 1, wherein said bus operation includes a memory read operation for writing to an I/O subsystem.

9. A computer system, comprising:
a main memory;
a processor coupled to said main memory;
a bus master, said bus master operable to provide a bus operation including a reservation command and a bus command;
a first bus bridge coupled to said main memory; and
a second bus bridge coupled between said first bus bridge and said bus master, said second bus bridge having at least one assignable data buffer and a forwarding bit, said second bus bridge operable to receive the bus operation and reserve a data buffer for the exclusive use of said bus master in response to said bus operation, said second bridge operable to forward said reservation command to the first bridge if said forwarding bit is set.

10. The computer system of claim 9, wherein said bus command includes a starting address and wherein said bus command and said reservation command together define an address range.

11. The computer system of claim 10, wherein said reservation command includes a count.

12. The computer system of claim 9, wherein if said bus command is a read operation
said second bus bridge fetches data according to the read operation and prefetches data according to said address range, the data being provided to said bus master when requested.

13. The computer system of claim 12, wherein when said bus master reads at a last address of the address range, the second bus bridge cancels the data buffer reservation.

14. The computer system of claim 9, wherein said reservation command is received after a frame signal is asserted.

15. The computer system of claim 9, wherein said second bus bridge and said bus master are coupled to a peripheral component interconnect (PCI) bus.

16. The computer system of claim 9, wherein said bus operation includes a memory read operation for writing to an I/O subsystem.

17. A computer system, comprising:
a main memory;
a processor coupled to said main memory;
an I/O subsystem;
a bus master coupled to said I/O subsystem, said bus master operable to provide a bus operation including a reservation command and a bus command; and
a bus bridge coupled between said main memory and said bus master, said bus bridge having at least one assignable data buffer, said bus bridge operable to receive the bus operation and reserve a data buffer for the exclusive use of said bus master in response to said bus operation.

18. The computer system of claim 17, wherein said bus command includes a starting address and wherein said bus command and said reservation command together define an address range.

19. The computer system of claim 18, wherein said reservation command includes a count.

20. The computer system of claim 18, wherein if said bus command is a read operation
said bus bridge fetches data according to the read operation and prefetches data according to said address range, the data being provided to the bus master when requested.

21. The computer system of claim 20, wherein when said bus master reads at a last address of the address range, said bus bridge cancels the data buffer reservation.

22. The computer system of claim 17, wherein said reservation command is received after a frame signal is asserted.

23. The computer system of claim 17, wherein the bus bridge and the bus master are coupled to a peripheral component interconnect (PCI) bus.

24. The computer system of claim 17, wherein said bus operation includes a memory read operation for writing to said I/O subsystem.

25. A computer system, comprising:
a main memory;
a processor coupled to said main memory;
an I/O subsystem;
a bus master coupled to said I/O subsystem, said bus master operable to provide a bus operation including a reservation command and a bus command;
a first bus bridge coupled to said main memory; and
a second bus bridge coupled between said first bus bridge and said bus master, said second bus bridge having at least one assignable data buffer and a forwarding bit, said second bus bridge operable to receive the bus operation and reserve a data buffer for the exclusive use of said bus master in response to said bus operation, said second bridge operable to forward said reservation command to the first bridge if said forwarding bit is set.

26. The computer system of claim 25, wherein said bus command includes a starting address and wherein said bus command and said reservation command together define an address range.

27. The computer system of claim 26, wherein said reservation command includes a count.

28. The computer system of claim 25, wherein if said bus command is a read operation
said second bus bridge fetches data according to the read operation and prefetches data according to said address range, the data being provided to said bus master when requested.

29. The computer system of claim 28, wherein when said bus master reads at a last address of the address range, the second bus bridge cancels the data buffer reservation.

30. The computer system of claim 25, wherein said reservation command is received after a frame signal is asserted.

31. The computer system of claim 25, wherein said second bus bridge and said bus master are coupled to a peripheral component interconnect (PCI) bus.

32. The computer system of claim 25, wherein said bus operation includes a memory read operation for writing to said I/O subsystem.

33. A computer system, comprising:
a main memory;
a processor coupled to said main memory;
a video subsystem;
a bus master coupled to said video subsystem, said bus master operable to provide a bus operation including a reservation command and a bus command; and
a bus bridge coupled between said main memory and said bus master, said bus bridge having at least one assignable data buffer, said bus bridge operable to receive the bus operation and reserve a data buffer for the exclusive use of said bus master in response to said bus operation.

34. The computer system of claim 33, wherein said bus command includes a starting address and wherein said bus command and said reservation command together define an address range.

35. The computer system of claim 34, wherein said reservation command includes a count.

36. The computer system of claim 34, wherein if said bus command is a read operation said bus bridge fetches data according to the read operation and prefetches data according to said address range, the data being provided to the bus master when requested.

37. The computer system of claim 36, wherein when said bus master reads at a last address of the address range, said bus bridge cancels the data buffer reservation.

38. The computer system of claim 33, wherein said reservation command is received after a frame signal is asserted.

39. The computer system of claim 33, wherein the bus bridge and the bus master are coupled to a peripheral component interconnect (PCI) bus.

40. The computer system of claim 33, wherein said bus operation includes a memory read operation for writing to said video subsystem.

41. A computer system, comprising:
a main memory;
a processor coupled to said main memory;
a video subsystem;
a bus master coupled to said video subsystem, said bus master operable to provide a bus operation including a reservation command and a bus command;
a first bus bridge coupled to said main memory; and
a second bus bridge coupled between said first bus bridge and said bus master, said second bus bridge having at least one assignable data buffer and a forwarding bit, said second bus bridge operable to receive the bus operation and reserve a data buffer for the exclusive use of said bus master in response to said bus operation, said second bridge operable to forward said reservation command to the first bridge if said forwarding bit is set.

42. The computer system of claim 41, wherein said bus command includes a starting address and wherein said bus command and said reservation command together define an address range.

43. The computer system of claim 42, wherein said reservation command includes a count.

44. The computer system of claim 43, wherein if said bus command is a read operation said second bus bridge fetches data according to the read operation and prefetches data according to said address range, the data being provided to said bus master when requested.

45. The computer system of claim 44, wherein when said bus master reads at a last address of the address range, the second bus bridge cancels the data buffer reservation.

46. The computer system of claim 41, wherein said reservation command is received after a frame signal is asserted.

47. The computer system of claim 41, wherein said second bus bridge and said bus master are coupled to a peripheral component interconnect (PCI) bus.

48. The computer system of claim 41, wherein said bus operation includes a memory read operation for writing to said video subsystem.

49. A computer system, comprising:
a main memory;
a processor coupled to said main memory;
a mass storage system;
a bus master means coupled to said mass storage system, said bus master means operable to provide a bus operation including a reservation command and a bus command; and
a bus bridge means coupled between said main memory and said bus master means, said bus bridge means having at least one assignable data buffer, said bus bridge means operable to receive the bus operation and reserve a data buffer for the exclusive use of said bus master means in response to said bus operation.

50. The computer system of claim 49, wherein said bus command includes a starting address and wherein said bus command and said reservation command together define an address range.

51. The computer system of claim 50, wherein said reservation command includes a count.

52. The computer system of claim 50, wherein if said bus command is a read operation said bus bridge means fetches data according to the read operation and prefetches data according to said address range, the data being provided to the bus master means when requested.

53. The computer system of claim 52, wherein when said bus master means reads at a last address of the address range, said bus bridge means cancels the data buffer reservation.

54. The computer system of claim 49, wherein said reservation command is received after a frame signal is asserted.

55. The computer system of claim 49, wherein the bus bridge means and the bus master means are coupled to a peripheral component interconnect (PCI) bus.

56. The computer system of claim 49, wherein said bus operation includes a memory read operation for writing to said mass storage system.

57. A computer system, comprising:
a main memory;
a processor coupled to said main memory;
a mass storage system;
a bus master means coupled to said mass storage system, said bus master means operable to provide a bus operation including a reservation command and a bus command;
a first bus bridge means coupled to said main memory; and
a second bus bridge means coupled between said first bus bridge means and said bus master means, said second bus bridge means having at least one assignable data buffer and a forwarding bit, said second bus bridge means operable to receive the bus operation and reserve a data buffer for the exclusive use of said bus master means in response to said bus operation, said second bridge means operable to forward said reservation command to the first bridge means if said forwarding bit is set.

58. The computer system of claim 57, wherein said bus command includes a starting address and wherein said bus command and said reservation command together define an address range.

59. The computer system of claim 58, wherein said reservation command includes a count.

60. The computer system of claim 57, wherein if said bus command is a read operation said second bus bridge means fetches data according to the read operation and prefetches data according to said address range, the data being provided to said bus master means when requested.

61. The computer system of claim 60, wherein when said bus master means reads at a last address of the address range, the second bus bridge means cancels the data buffer reservation.

62. The computer system of claim 57, wherein said reservation command is received after a fame signal is asserted.

63. The computer system of claim 57, wherein said second bus bridge means and said bus master means are coupled to a peripheral component interconnect (PCI) bus.

64. The computer system of claim 57, wherein said bus operation includes a memory read operation for writing to said mass storage system.

65. A bus bridge chip for communicating with a bus master, the bus bridge chip having at least one data buffer, the bus bridge chip comprising:

means for receiving a reservation command from the bus master; and means for reserving a data buffer for the bus master in response to said reservation command.

66. The bus bridge chip of claim 65, further comprising:

means for receiving a bus command after receiving the reservation command.

67. The bus bridge chip of claim 66, wherein said bus command includes a starting address and wherein said bus command and said reservation command together define an address range.

68. The bus bridge chip of claim 67, wherein said reservation command includes a count.

69. The bus bridge chip of claim 67, further comprising:

means for fetching data according to a read operation, the data being passed through the reserved data buffer;

means for prefetching data according to the read operation and said address range, the prefetched data being written into the reserved data buffer; and means for providing the fetched and prefetched data to the bus master.

70. A system board capable of communicating with a bus master, the system board having at least one data buffer, the system board comprising:

means for receiving a reservation command from the bus master; and means for reserving a data buffer for the bus master in response to said reservation command.

71. The system board of claim 70, further comprising:

means for receiving a bus command after receiving the reservation command.

72. The system board of claim 71, wherein said bus command includes a starting address and wherein said bus command and said reservation command together define an address range.

73. The system board of claim 72, wherein said reservation command includes a count.

74. The system board of claim 72, further comprising:

means for fetching data according to a read operation, the data being passed through the reserved buffer;

means for prefetching data according to the read operation and said address range, the prefetched data being written into the reserved data buffer; and means for providing the fetched and prefetched data to the bus master.

75. A computer system capable of communicating with an I/O subsystem that acts as a bus master, the computer system having at least one data buffer, the computer system comprising:

means for receiving a reservation command from the bus master; and means for reserving a data buffer for the bus master in response to said reservation command.

76. The computer system of claim 75, further comprising:

means for receiving a bus command after receiving the reservation command.

77. The computer system of claim 76, wherein said bus command includes a starting address and wherein said bus command and said reservation command together define an address range.

78. The computer system of claim 77, wherein said reservation command includes a count.

79. The computer system of claim 77, further comprising:

means for fetching data according to a read operation, the data being passed through the reserved buffer;

means for prefetching data according to the read operation and said address range, the prefetched data being written into the reserved data buffer; and means for providing the fetched and prefetched data to the bus master.

80. A bus bridge chip for communicating with a bus master, the bus bridge chip comprising:

at least one assignable data buffer;

logic for receiving a bus operation from the bus master; and logic for reserving an assignable data buffer for the exclusive use of the bus master in response the bus operation.

* * * * *

UNITED STATES PATENT AND TRADEMARK OFFICE
CERTIFICATE OF CORRECTION

PATENT NO. : 6,260,095 B1
DATED : July 10, 2001
INVENTOR(S) : Alan L. Goodrum

It is certified that error appears in the above-identified patent and that said Letters Patent is hereby corrected as shown below:

Column 21,
Line 10, delete "fame" and insert therefor -- frame --

Column 22,
Line 50, after "response" insert -- to --

Signed and Sealed this

Twenty-sixth Day of July, 2005

JON W. DUDAS
*Director of the United States Patent and Trademark Office*